(12) United States Patent
Geekie et al.

(10) Patent No.: US 11,463,216 B2
(45) Date of Patent: Oct. 4, 2022

(54) TECHNIQUES FOR THERMAL MITIGATION AND POWER SAVING

(71) Applicant: QUALCOMM Incorporated, San Diego, CA (US)

(72) Inventors: James Francis Geekie, Carlsbad, CA (US); Mahbod Ghelichi, San Diego, CA (US); Chun-Hao Hsu, San Jose, CA (US); Zae Yong Choi, San Jose, CA (US); Yung-Yih Jian, Campbell, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/111,916

(22) Filed: Dec. 4, 2020

(65) Prior Publication Data

US 2022/0182198 A1    Jun. 9, 2022

(51) Int. Cl.
| | |
|---|---|
| H04L 5/00 | (2006.01) |
| H04B 7/06 | (2006.01) |
| H04L 1/00 | (2006.01) |

(52) U.S. Cl.
CPC ......... *H04L 5/0048* (2013.01); *H04B 7/0626* (2013.01); *H04L 1/0026* (2013.01); *H04L 5/0023* (2013.01)

(58) Field of Classification Search
CPC ... H04B 7/0626; H04L 1/0026; H04L 5/0023; H04L 5/0048
See application file for complete search history.

(56) References Cited

U.S. PATENT DOCUMENTS

2012/0039273 A1    2/2012 Nam et al.
2020/0145062 A1*   5/2020 Jung ............... H04W 48/20
(Continued)

FOREIGN PATENT DOCUMENTS

EP    2940885 A2    11/2015

OTHER PUBLICATIONS

Huawei, et al., "UE Dynamic Adaptation to the Maximum Number of MIMO Layer", 3GPP TSG RAN WG1 Meeting #98bis, 3GPP Draft, R1-1910078, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-Oct. 20, 2019, 5 Pages, Oct. 5, 2019 (Oct. 5, 2019), XP051788885, Retrieved from the Internet: URL: http://www.3qpp.org/ftp/tsg_ran/WG1_RL1/TSGR1_98b/Docs/R1-1910078.zip [retrieved on Oct. 5, 2019] Sections 2-3, the whole document.
(Continued)

*Primary Examiner* — David B Lugo
(74) *Attorney, Agent, or Firm* — Holland & Hart LLP

(57) ABSTRACT

Methods, systems, and devices for wireless communications are described. A user equipment (UE) may be configured to receive a first configuration indicating for the UE to communicate with the base station using a set of receive ports. The UE may transmit, according to the first configuration in a first time interval associated with a first power state of the UE, sounding reference signals (SRSs) on a set of transmit ports corresponding to the set of receive ports. The UE may then communicate using less than all of the set of transmit ports for the SRSs based on determining to operate in a reduced power state. The UE may then receive, based on communicating using less than all of the set of transmit ports for the SRSs, a second configuration indicating for the UE to communicate with the base station using a first subset of receive ports.

30 Claims, 14 Drawing Sheets

(56) References Cited

U.S. PATENT DOCUMENTS

2020/0412505 A1* 12/2020 Davydov .......... H04W 72/0413
2021/0185614 A1* 6/2021 Zhou ..................... H04L 5/0051

OTHER PUBLICATIONS

International Search Report and Written Opinion—PCT/US2021/056484—ISA/EPO—Feb. 7, 2022.
ZTE: "Enhancements on SRS Flexibility, Coverage and Capacity", 3GPP TSG RAN WG1 Meeting #103-e, 3GPP Draft, R1-2007768, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, 13 Pages, Oct. 24, 2020 (Oct. 24, 2020), XP051946502, Retrieved from the Internet: URL: https://ftp.3qpp.org/tsg_ran/WG1_RL1/TSGR1_103-e/Docs/R1-2007768.zip R1-2007768 Enhancements on SRS flexibility, coverage and capacity.docx [retrieved on Oct. 24, 2020] the whole document.

* cited by examiner

TECHNIQUES FOR THERMAL MITIGATION AND POWER SAVING

FIELD OF TECHNOLOGY

The present disclosure relates to wireless communications, including techniques for thermal mitigation and power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, thermal states (e.g., temperatures) of wireless devices (e.g., UEs) may affect the ability of the wireless devices to efficiently and reliably communicate within the wireless communications systems. For example, a modem baseband and/or a radio frequency transceiver of a UE may be unable to perform wireless communications in cases where a skin temperature (e.g., surface temperature) and/or junction temperature (e.g., substrate temperature) of the UE exceeds certain thermal thresholds. Accordingly, some wireless devices (e.g., UEs) may be configured to implement a variety of thermal mitigation and power savings techniques in order to reduce operating temperatures, conserve power, or both. However, some thermal mitigation techniques and/or power savings techniques are deficient in the context of fifth generation (5G) and New Radio (NR) access technologies.

SUMMARY

The described techniques relate to improved methods, systems, devices, and apparatuses that support techniques for thermal mitigation and power saving. Generally, the described techniques provide for thermal mitigation and power savings at a user equipment (UE). In particular, techniques for sounding reference signal (SRS) antenna switching (SRS-AS) for thermal mitigation and power savings in the context of fifth generation (5G) and New Radio (NR) access technologies. According to some aspects, a UE may be configured to transmit SRSs on a subset of transmit ports corresponding to a subset of receive ports in order to indicate that the UE is to "fallback" to a lower transmission-reception mode. In this regard, the UE may sound SRSs for a subset of receive ports at the UE in order to fallback from a transmission-reception mode using a higher number of receive ports (such as four receive ports (e.g., 1T4R, 2T4R)) to a transmission-reception mode using a lower number of receive ports (such as one or two receive ports (e.g., 1T1R, 2T1R, 1T2R, 2T2R)).

For instance, while operating in a first power state (e.g., normal or full power state, or normal or full operating state), a UE may transmit SRSs on each transmit port corresponding to each receive port at the UE (e.g., sound all four receive ports). Such transmission of SRS on all receive ports is not necessarily simultaneous in the first power state, as antenna switching may be used to transmit alternately on different SRS ports. Subsequently, the UE may determine to operate in a reduced-power state based on identifying high thermal levels (e.g., high temperatures), a low power level (e.g., low battery level), or both. In this regard, the UE may reduce a quantity of transmit ports over which SRSs are transmitted, or completely refrain from transmitting SRSs altogether. On the base station side, the base station may identify that SRSs are not being transmitted/received for at least a subset of the receive ports, and may thereby refrain from scheduling transmissions for the respective receive ports. In this regard, by reducing (or eliminating) a quantity of transmit ports used to transmit SRSs, the UE may induce the base station to reduce a rank (e.g., quantity of layers) associated with wireless communications at the UE, which may thereby reduce power consumption and/or thermal levels at the UE, for example by allowing the UE to disable, turn off, or otherwise deactivate one or more radio frequency transmit chains of the UE.

A method for wireless communication at a UE is described. The method may include receiving, from a base station, a first configuration indicating that the UE is to communicate with the base station using a set of multiple receive ports of the UE, transmitting, according to the first configuration in a first time interval associated with a first power state of the UE, SRSs on a set of multiple transmit ports corresponding to the set of multiple receive ports, communicating with the base station during a second time interval following the first time interval using less than all of the set of multiple transmit ports for the SRSs based on the UE determining to operate in a second power state lower than the first power state, and receiving, from the base station based on communicating with the base station using less than all of the set of multiple transmit ports for the SRSs, a second configuration indicating for the UE to communicate with the base station using a first subset of receive ports of the set of multiple receive ports.

An apparatus for wireless communication at a UE is described. The apparatus may include a processor, memory in electronic communication with the processor, and instructions stored in the memory. The instructions may be executable by the processor to cause the apparatus to receive, from a base station, a first configuration indicating that the UE is to communicate with the base station using a set of multiple receive ports of the UE, transmit, according to the first configuration in a first time interval associated with a first power state of the UE, SRSs on a set of multiple transmit ports corresponding to the set of multiple receive ports, communicate with the base station during a second time interval following the first time interval using less than all of the set of multiple transmit ports for the SRSs based on the UE determining to operate in a second power state lower than the first power state, and receive, from the base station based on communicating with the base station using less than all of the set of multiple transmit ports for the SRSs, a second configuration indicating for the UE to communicate with the base station using a first subset of receive ports of the set of multiple receive ports.

Another apparatus for wireless communication at a UE is described. The apparatus may include means for receiving, from a base station, a first configuration indicating that the UE is to communicate with the base station using a set of multiple receive ports of the UE, means for transmitting, according to the first configuration in a first time interval associated with a first power state of the UE, SRSs on a set of multiple transmit ports corresponding to the set of multiple receive ports, means for communicating with the base station during a second time interval following the first time interval using less than all of the set of multiple transmit ports for the SRSs based on the UE determining to operate in a second power state lower than the first power state, and means for receiving, from the base station based on communicating with the base station using less than all of the set of multiple transmit ports for the SRSs, a second configuration indicating for the UE to communicate with the base station using a first subset of receive ports of the set of multiple receive ports.

A non-transitory computer-readable medium storing code for wireless communication at a UE is described. The code may include instructions executable by a processor to receive, from a base station, a first configuration indicating that the UE is to communicate with the base station using a set of multiple receive ports of the UE, transmit, according to the first configuration in a first time interval associated with a first power state of the UE, SRSs on a set of multiple transmit ports corresponding to the set of multiple receive ports, communicate with the base station during a second time interval following the first time interval using less than all of the set of multiple transmit ports for the SRSs based on the UE determining to operate in a second power state lower than the first power state, and receive, from the base station based on communicating with the base station using less than all of the set of multiple transmit ports for the SRSs, a second configuration indicating for the UE to communicate with the base station using a first subset of receive ports of the set of multiple receive ports.

In some examples of the method, apparatuses, and non-transitory computer-readable medium described herein, communicating with the base station using less than all of the set of multiple transmit ports for the SRSs may include operations, features, means, or instructions for refraining from transmitting SRSs on all transmit ports of the set of multiple transmit ports, where receiving the second configuration may be based on the UE refraining from transmitting SRSs on all of the transmit ports.

In some examples of the method, apparatuses, and non-transitory computer-readable medium described herein, communicating with the base station using less than all of the set of multiple transmit ports for the SRSs may include operations, features, means, or instructions for transmitting, during the second time interval, SRSs on a subset of transmit ports of the set of multiple transmit ports, where receiving the second configuration may be based on transmitting the SRSs on the subset of transmit ports.

Some examples of the method, apparatuses, and non-transitory computer-readable medium described herein may further include operations, features, means, or instructions for determining one or more parameters associated with the set of multiple receive ports and selecting the subset of transmit ports of the set of multiple transmit ports corresponding to a subset of receive ports of the set of multiple receive ports based on the one or more parameters, where transmitting the SRSs on the subset of transmit ports may be based on the selecting.

In some examples of the method, apparatuses, and non-transitory computer-readable medium described herein, the one or more parameters associated with the set of multiple receive ports include a received signal strength indicator (RSSI) metric, a reference signal received power (RSRP) metric, a reference signal received quality (RSRQ) metric, a signal-to-noise ratio (SNR), a signal-to-interference plus noise ratio (SINR), or any combination thereof.

In some examples of the method, apparatuses, and non-transitory computer-readable medium described herein, the set of multiple transmit ports includes four transmit ports, and the subset of transmit ports includes one or two transmit ports.

Some examples of the method, apparatuses, and non-transitory computer-readable medium described herein may further include operations, features, means, or instructions for determining to operate in the second power state based on determining that a thermal state at the UE may be greater than or equal to a threshold thermal state, where communicating with the base station using less than all of the set of multiple transmit ports for the SRSs may be based on determining that the thermal state at the UE may be greater than or equal to the threshold thermal state.

In some examples of the method, apparatuses, and non-transitory computer-readable medium described herein, the thermal state includes a skin temperate of the UE, a junction temperature of the UE, or both.

Some examples of the method, apparatuses, and non-transitory computer-readable medium described herein may further include operations, features, means, or instructions for determining to operate in the second power state based on determining that a power level at the UE satisfies a threshold power level, where communicating with the base station using less than all of the set of multiple transmit ports for the SRSs may be based on determining that the power level at the UE satisfies the threshold power level.

In some examples of the method, apparatuses, and non-transitory computer-readable medium described herein, the power level satisfies the threshold power level when the power level may be less than or equal to the threshold power level.

In some examples of the method, apparatuses, and non-transitory computer-readable medium described herein, the power level includes a battery level of the UE.

Some examples of the method, apparatuses, and non-transitory computer-readable medium described herein may further include operations, features, means, or instructions for transmitting, to the base station, a channel state feedback (CSF) report based on the UE determining to operate in the second power state, where receiving the second configuration may be based on transmitting the CSF report and communicating with the base station using less than all of the set of multiple transmit ports for the SRSs.

Some examples of the method, apparatuses, and non-transitory computer-readable medium described herein may further include operations, features, means, or instructions for determining a rank associated with communications with the base station using one or more receive ports of the set of multiple receive ports and selectively adjusting the determined rank to generate an adjusted rank less than the determined rank based on the UE determining to operate in the second power state, where the CSF report includes an indication of the adjusted rank.

Some examples of the method, apparatuses, and non-transitory computer-readable medium described herein may further include operations, features, means, or instructions for determining a channel quality indicator (CQI) associated with communications with the base station using one or more receive ports of the set of multiple receive ports and selectively adjusting the determined CQI to generate an adjusted CQI less than the determined CQI based on the UE determining to operate in the second power state, where the CSF report includes an indication of the adjusted CQI.

Some examples of the method, apparatuses, and non-transitory computer-readable medium described herein may further include operations, features, means, or instructions for transmitting, to the base station, a capability report including an indication of one or more transmission-reception modes supported by the UE, where receiving the first configuration may be based on transmitting the capability report.

In some examples of the method, apparatuses, and non-transitory computer-readable medium described herein, the one or more transmission-reception modes include a transmission-reception mode indicating one transmission port and four reception ports for the UE, a transmission-reception mode indicating two transmission ports and four reception ports for the UE, or both.

In some examples of the method, apparatuses, and non-transitory computer-readable medium described herein, selectively adjusting one or more parameters associated with a second subset of receive ports of the set of multiple receive ports based on receiving the second configuration.

In some examples of the method, apparatuses, and non-transitory computer-readable medium described herein, the one or more parameters may be associated with a low-noise amplifier (LNA) for the second subset of receive ports, a phase shifter for the second subset of receive ports, or both.

DETAILED DESCRIPTION

Figure 1:
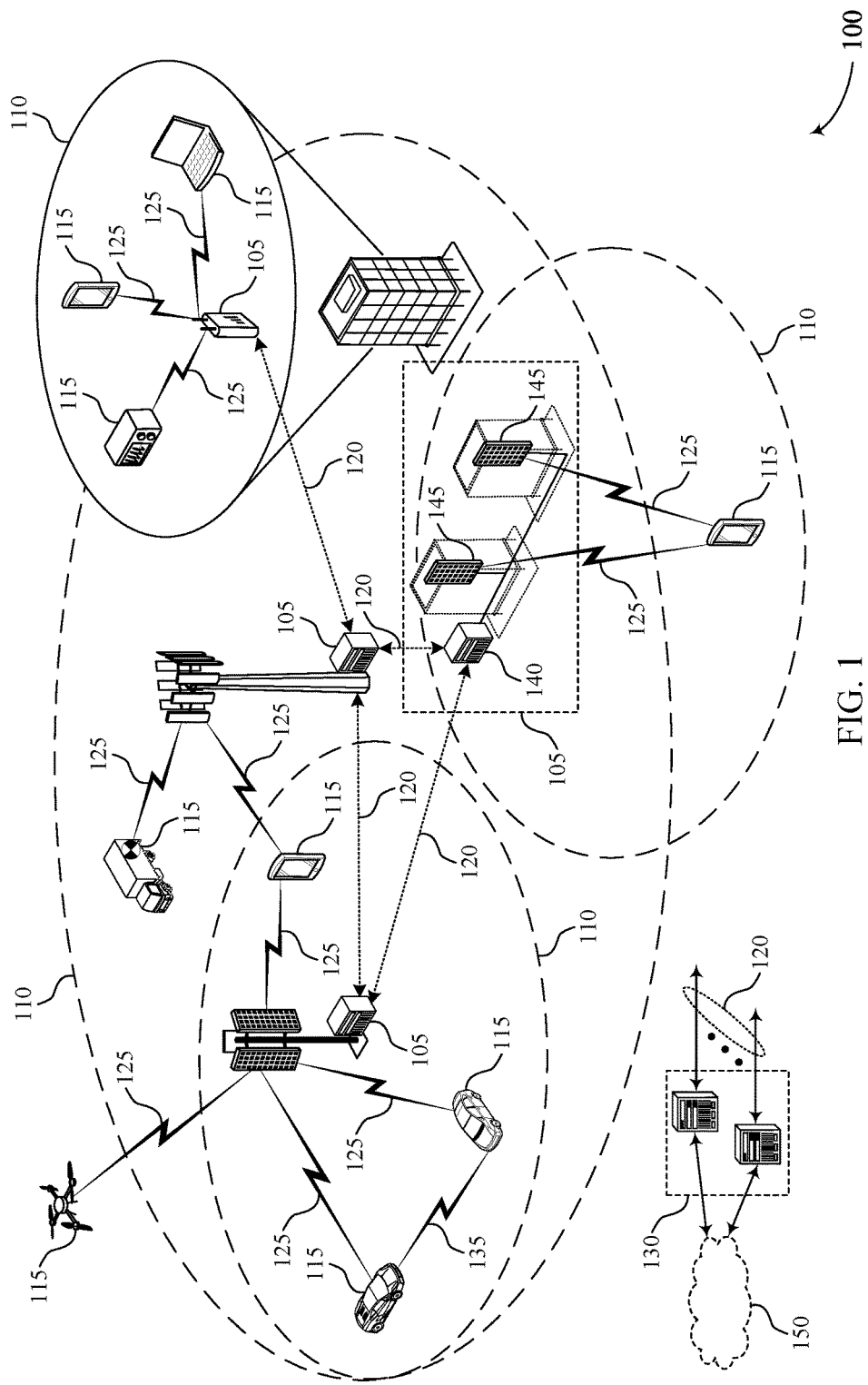
FIG. 1 illustrates an example of a wireless communications system that supports techniques for thermal mitigation and power saving in accordance with aspects of the present disclosure.

In some wireless communications systems, thermal states (e.g., temperatures) of wireless devices (e.g., user equipments (UEs)) may affect the ability of the wireless devices to efficiently and reliably communicate within the wireless communications systems. For example, a modem baseband and/or a radio frequency transceiver of a UE may be unable to perform wireless communications in cases where a skin temperature $T_{skin}$ (e.g., surface temperature) and/or junction temperature $T_j$ (e.g., substrate temperature) of the UE exceeds certain thermal thresholds (e.g., if $T_{skin}$>43° C., and/or $T_j$>95° C.). Accordingly, some wireless devices (e.g., UEs) may be configured to implement a variety of thermal mitigation and power savings techniques in order to reduce operating temperatures (e.g., $T_{skin}$, $T_j$), conserve power, or both. For example, in the context of long-term evolution (LTE) communications which utilize carrier aggregation techniques, a UE may conserve power and reduce operating temperatures by dropping carriers associated with secondary cells. For instance, the UE may report poor channel quality indicators associated with carriers of secondary cells in order to induce the base station to stop scheduling transmissions on the indicated carriers, thereby resulting in the carriers being dropped at the UE. By reducing the quantity of carriers which are monitored at the UE, power consumption may be reduced, and operating temperatures at the UE may be reduced. However, as compared to LTE radio access technologies which utilize multiple carrier aggregation, fifth generation (5G) and New Radio (NR) radio access technologies may utilize a single component carrier. In this regard, techniques used for thermal mitigation and power savings used in LTE access technologies may not be usable for 5G and NR access technologies, for example when the UE is operating in a standalone mode of operation.

Accordingly, techniques for thermal mitigation and power savings at a UE are disclosed. In particular, techniques for sounding reference signal antenna switching (SRS-AS) for thermal mitigation and power savings in the context of NR and 5G access technologies are described. According to some aspects, a UE may be configured to transmit SRSs on a subset of transmit ports corresponding to a subset of receive ports in order to indicate that the UE is to "fallback" to a lower transmission-reception mode. In this regard, the UE may sound SRSs for a subset of receive ports at the UE in order to fallback from a transmission-reception mode using a higher number of receive ports (such as four receive ports (e.g., 1T4R, 2T4R)) to a transmission-reception mode using a lower number of receive ports (such as one or two receive ports (e.g., 1T1R, 2T1R, 1T2R, 2T2R)).

For example, while operating in a first power state (e.g., normal power state, or normal operating state), a UE may transmit SRSs on each transmit port corresponding to each receive port at the UE (e.g., sound all four receive ports). Such transmission of SRS on all receive ports is not necessarily simultaneous in the first power state, as antenna switching may be used to transmit alternately on different SRS ports. Subsequently, the UE may determine to operate in a reduced-power state based on identifying high thermal levels (e.g., high temperatures), a low power level (e.g., low battery level), or both. In this regard, the UE may reduce a quantity of transmit ports over which SRSs are transmitted, or completely refrain from transmitting SRSs altogether. On the base station side, the base station may identify that SRSs are not being transmitted or received for at least a subset of the receive ports, and may thereby refrain from scheduling transmissions for the respective receive ports. In this regard, by reducing (or eliminating) a quantity of transmit ports used to transmit SRSs, the UE may induce the base station to reduce a rank (e.g., quantity of layers) associated with wireless communications at the UE, which may thereby reduce power consumption and/or thermal levels at the UE, for example by allowing the UE to disable, turn off, or otherwise deactivate one or more radio frequency transmit chains of the UE.

In some cases, a UE may be configured to spoof (e.g., fake) channel state feedback (CSF) reports to the base station in addition to performing SRS-AS in order to further induce the base station to reduce a rank associated with wireless communications at the UE. For example, in addition to refraining from transmitting SRSs on transmit ports associated with receive ports, the UE may additionally report poor channel quality indicators associated with wireless communications at the respective receive ports in order to induce the base station to refrain from scheduling transmissions at the respective receive ports. In some aspects, the techniques disclosed herein may be used to reduce a rank of wireless communications at a UE in the context of NR communications, which may thereby result in reduced power consumption and therefore reduced temperatures at the UE. Such thermal mitigation techniques may be applied in the context of wireless communications within multiple frequency ranges of NR communications (e.g., FR1, FR2, or both).

Aspects of the disclosure are initially described in the context of wireless communications systems. Additional aspects of the disclosure are described in the context of example communications schemes and an example process flow. Aspects of the disclosure are further illustrated by and described with reference to apparatus diagrams, system diagrams, and flowcharts that relate to techniques for thermal mitigation and power saving.

FIG. 1 illustrates an example of a wireless communications system 100 that supports techniques for thermal mitigation and power saving in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes (e.g., power states) that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems (e.g., wireless communications system 100), base stations 105 may utilize SRS-AS to measure channel quality (e.g., measure rank and/or channel quality indicators (CQIs)) between UEs 115 and the base stations 105. Moreover, the base stations 105 may configure UEs 115 to operate in one or more transmission-reception modes (e.g., 1T4R, 2T4R), where SRS-AS is performed in the respective transmission-reception modes by transmitting SRSs on a single antenna port in a circular (e.g., "round robin") fashion. For example, in the context of a 1T4R transmission-reception mode, a UE 115 may be configured to use one transmit antenna port and four receive antenna ports in a first power state (e.g., normal or default power state). Comparatively, in the context of a 2T4R transmission-reception mode, a UE 115 may be configured to use two transmit antenna ports and four receive antenna ports in the first power state (e.g., normal or default power state), The UEs 115 of the wireless communications system 100 may support techniques for thermal mitigation and power savings at the UEs 115. In particular, the UEs 115 of the wireless communications system 100 may be configured to perform SRS-AS techniques for thermal mitigation and power savings in the context of NR and 5G access technologies in order to induce the base stations 105 of the wireless communications system 100 to reduce a rank (e.g., reduce a quantity of layers) associated with wireless communications at the UEs 115. In this regard, by inducing the base stations 105 to reduce a rank of wireless communications, techniques described herein may enable the UEs 115 to deactivate receive ports at the UEs 115, enter lower power states, reduce power consumption at the UEs 115, and reduce temperatures at the UEs 115.

For example, while operating in a first power state (e.g., normal power state, or normal operating state), a UE 115 of the wireless communications system 100 may transmit SRSs on each transmit port corresponding to each receive port at the UE 115 (e.g., sound all four receive ports). Such transmission of SRS on all receive ports is not necessarily simultaneous in the first power state, as antenna switching may be used to transmit alternately on different SRS ports. Subsequently, the UE 115 may determine to operate in a reduced-power state based on identifying high thermal levels (e.g., high temperatures), a low power level (e.g., low battery level), or both. In this regard, the UE 115 may reduce a quantity of transmit ports over which SRSs are transmitted, or completely refrain from transmitting SRSs altogether. From the perspective of the base station 105, the base station 105 may identify that SRSs are not being transmitted/received for at least a subset of the receive ports, and may thereby refrain from scheduling transmissions for the respective receive ports. In this regard, by reducing (or eliminating) a quantity of transmit ports used to transmit SRSs, the UE 115 may induce the base station to reduce a rank (e.g., quantity of layers) associated with wireless communications at the UE 115, which may thereby reduce power consumption and/or thermal levels at the UE 115, for example by allowing the UE 115 to disable, turn off, or otherwise deactivate one or more radio frequency transmit chains of the UE 115.

In some cases, a UE 115 may be configured to spoof (e.g., fake) CSF reports to the base station 105 in addition to performing SRS-AS in order to further induce the base station 105 to reduce a rank associated with wireless communications at the UE 115. For example, in addition to refraining from transmitting SRSs on transmit ports associated with receive ports, the UE 115 may additionally report poor channel quality indicators associated with wireless communications at the respective receive ports in order to induce the base station 105 to refrain from scheduling transmissions at the respective receive ports. In some aspects, the techniques disclosed herein may be used to reduce a rank of wireless communications at a UE in the context of NR communications, which may thereby result in reduced power consumption and therefore reduced temperatures at the UE.

The techniques described herein may enable UEs 115 of the wireless communications system 100 to reduce a power state at the UEs 115, correspondingly reducing a power consumption at the UEs 115 and reducing a temperature at the UEs 115. In particular, techniques described herein may enable the UEs 115 to perform SRS-AS in which the UEs 115 refrain from transmitting SRSs and/or transmit SRSs using a subset of transmit ports in order to induce a base station 105 to reduce a rank of scheduled transmissions. In this regard, by inducing the base station 105 to reduce a rank of scheduled transmissions, the UEs 115 may be able to deactivate one or more receive ports at the UEs 115, thereby enabling the UEs 115 to enter a lower power state, reduce power consumption, and reduce a temperature at the UEs 115. Such thermal mitigation and power savings techniques may enable the UEs 115 to reduce power consumption at both modem baseband and radio frequency transceiver components of the UEs 115.

Figure 2:
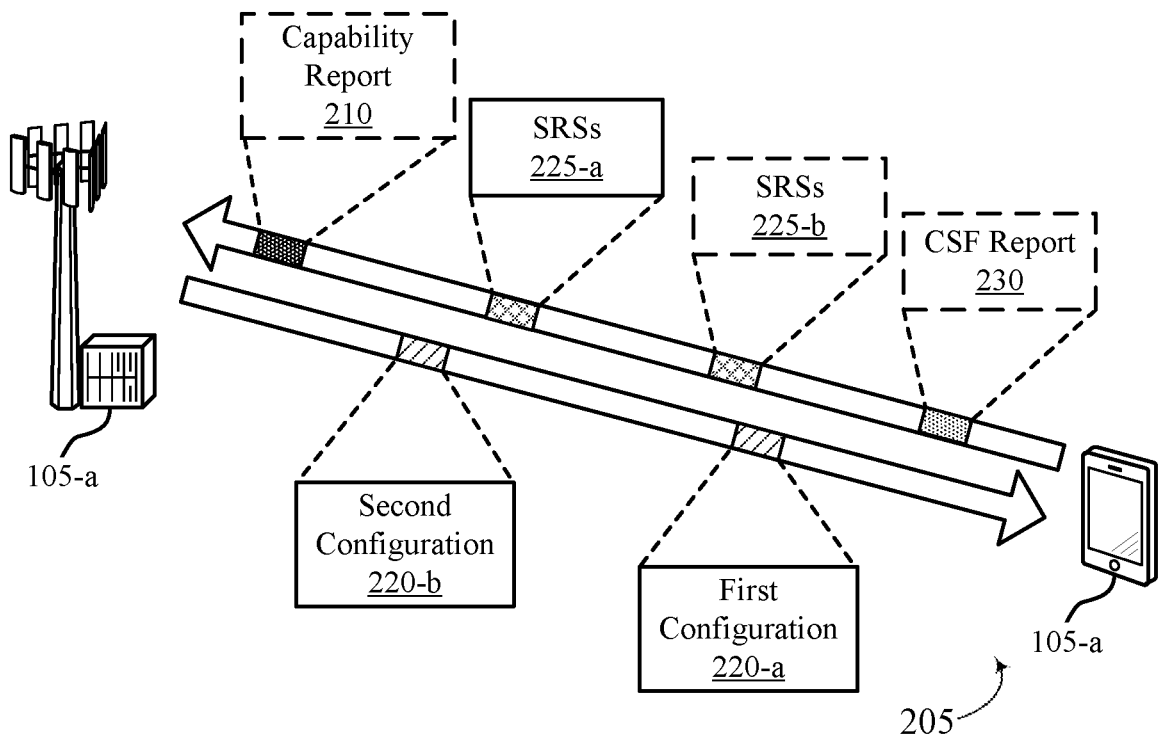
FIG. 2 illustrates an example of a wireless communications system that supports techniques for thermal mitigation and power saving in accordance with aspects of the present disclosure.
Figure 2:
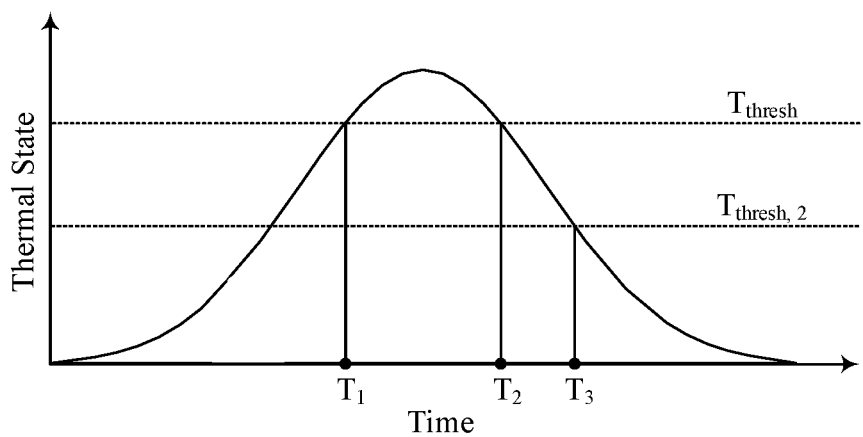

FIG. 2 illustrates an example of a wireless communications system 200 that supports techniques for thermal mitigation and power saving in accordance with aspects of the present disclosure. In some examples, wireless communications system 200 may implement aspects of wireless communications system 100. The wireless communications system 200 may include a UE 115-a and a base station 105-a, which may be examples of UEs 115 and base stations 105 described with reference to FIG. 1.

The UE 115-a and the base station 105-a of the wireless communications system 200 may communicate with one another via a communication link 205. The communication link 205 may include an example of a link between two UEs 115 (e.g., a sidelink communication link, or PC5 link). In this regard, the communication link 205 may include a bi-directional links which supports both uplink and downlink transmissions.

In some aspects, the UE 115-a and the base station 105-a of the wireless communications system 200 may support techniques for thermal mitigation and power savings at the UE 115-a. In particular, the UE 115-a of the wireless communications system 200 may be configured to perform SRS-AS techniques for thermal mitigation and power savings in the context of NR and 5G access technologies in order to induce the base station 105 of the wireless communications system 200 to reduce a rank (e.g., reduce a quantity of layers) associated with wireless communications at the UE 115-a. In this regard, by inducing the base station 105-a to reduce a rank of wireless communications, techniques described herein may enable the UE 115-a to deactivate receive ports at the UE 115-a, enter a lower power state, reduce power consumption at the UE 115-a, and reduce temperatures at the UE 115-a.

For example, the UE 115-a may transmit a capability report 210 to the base station 105-a. In some aspects, the capability report 210 may include an indication of one or more transmission-reception modes supported by the UE 115-a. For example, the capability report 210 may indicate that the UE 115-a supports a transmission-reception mode including one transmission port and four reception ports (e.g., 1T4R), a transmission-reception mode including two transmission ports and four reception ports (e.g., 2T4R), or both. The UE 115-a may be configured to supports any quantity or type of transmission-reception modes including any quantity of transmission ports, any quantity of reception ports, or both.

In some aspects, the base station 105-a may transmit an indication of a first configuration 220-a for communications between the UE 115-a and the base station 105-a. The first configuration 220-a may indicate one or more parameters associated with wireless communications between the UE 115-a and the base station 105-a including a transmission-reception mode which is to be used at the UE 115-a, a quantity of transmission ports and/or reception ports to be used by the UE 115-a, or both. For example, the first configuration 220-a may indicate that the UE 115-a is to use one or more transmission-reception modes which was indicated in the capability report 210. The first configuration 220-a may be indicated to the UE 115-a via a control message (e.g., radio resource control (RRC) message, downlink control information (DCI) message, MAC-CE message).

In some aspects, the first configuration 220-a may indicate that the UE 115-a is to communicate with the base station 105-a using a set of receive ports of the UE 115-a. For example, the capability report 210 may indicate that the UE 115-a supports a 1T4R transmission-reception mode (e.g., a transmission-reception mode including a set of four receive ports). In this example, the first configuration 220-a may indicate that the UE 115-a is to communicate with the base station 105-a using the set of four receive ports of the UE 115-a.

In some aspects, the UE 115-a may transmit SRSs 225-a on a set of transmit ports corresponding to the set of receive ports associated with the first configuration 220-a. In this regard, the UE 115-a may transmit the SRSs 225-a according to the first configuration 220-a. In some cases, the UE 115-a may transmit the SRSs 225-a during a first time interval associated with a first power state of the UE 115-a. In some aspects, the base station 105-a may be configured to measure a channel quality (e.g., determine a CQI and/or rank) associated with communications between the UE 115-a and the base station 105-a based on the received SRSs 225-a. In some aspects, the UE 115-a may transmit the SRSs 225-a based on transmitting the capability report 210, receiving the first configuration 220-a, or both.

For example, the first configuration 220-a may indicate that the UE 115-a is to communicate with the base station 105-a using a set of four receive ports of the UE 115-a. In some aspects, each receive port of the set of receive ports may be associated with (e.g., correspond to) a respective transmit port at the UE 115-a. In other words, a first receive port may correspond to a first transmit port, a second receive port may correspond to a second transmit port, a third receive port may correspond to a third transmit port, and a fourth receive port may correspond to a fourth transmit port. In this example, the UE 115-a may transmit the SRSs 225-a according to the first configuration 220-a by transmitting the SRSs 225-a on the set of transmit ports (e.g., four transmit ports) corresponding to the set of receive ports (e.g., four receive ports) indicated in the first configuration 220-a.

In some aspects, the UE 115-a may transmit the SRSs 225-a in a first time interval (e.g., first TTI, first slot, first subframe) associated with a first power state of the UE 115-*a* (e.g., normal or default power state). Additionally, the UE 115-*a* may receive one or more signals (e.g., reference signals) from the base station 105-*a* using (e.g., according to) the first configuration 220-*a*. For example, in cases where the first configuration 220-*a* indicates that the UE 115-*a* is to communicate with the base station 105-*a* using a set of four receive ports, the UE 115-*a* may receive signals from the base station 105-*a* using each receive port of the set of four receive ports. In this example, the UE 115-*a* may be configured to decode four layers of downlink transmissions (e.g., four layers of physical downlink shared channel (PDSCH) transmissions) using the four receive ports.

In some aspects, the UE 115-*a* may determine to operate in the second power state that is lower than the first power state. In other words, the UE 115-*a* may determine to operate in the second power state (e.g., reduced power state) that is lower than the first power state. In this regard, the UE 115-*a* may determine that one or more trigger conditions for transitioning to a reduced power state have been satisfied.

The UE 115-*a* may determine to operate in the second power state based on any quantity of parameters or characteristics including, but not limited to, a thermal state (e.g., temperature) at the UE 115-*a*, a power level (e.g., battery level) at the UE 115-*a*, or both. For example, FIG. 1 illustrates a graph which shows a thermal state (e.g., temperature, $T_{skin}$, $T_j$) at the UE 115-*a* over time. As may be shown in FIG. 1, a thermal state (e.g., temperature) at the UE 115-*a* may increase over time due to communications or processing carried out at the UE 115-*a*, external temperatures or heat sources (e.g., direct sunlight, body heat), or any combination thereof.

In some aspects, the UE 115-*a* may be configured to transition from a first power state (e.g., normal or default power state) to a second power state (e.g., reduced power state) based on comparing a thermal state at the UE 115-*a* to one or more threshold thermal states. In particular, the UE 115-*a* may determine to operate in the second power state based on determining that a thermal state at the UE 115-*a* satisfies a threshold thermal state. In some cases, a thermal state at the UE 115-*a* may satisfy the threshold thermal state if the thermal state is greater than or equal to the threshold thermal state.

For example, as shown in FIG. 1, the thermal state (e.g., $T_{skin}$, $T_j$) of the UE 115-*a* may become equal or greater than a threshold thermal state T thresh at time $T_j$. In this example, the UE 115-*a* may determine to operate in the second power state at time $T_1$ based on determining that the thermal state of the UE 115-*a* is greater than or equal to the threshold thermal state. It is noted herein that different metrics of a thermal state may be associated with different threshold thermal states. For instance, a skin temperature $T_{skin}$ at the UE 115-*a* may be associated with a threshold skin temperature $T_{thresh,skin}$, such that the UE 115-*a* determines to operate in the second power state based on determining that $T_{skin} \geq T_{thresh,skin}$. By way of another example, a junction temperature $T_{skin}$ at the UE 115-*a* may be associated with a threshold junction temperature $T_{thresh,j}$ such that the UE 115-*a* determines to operate in the second power state based on determining that $T_j \geq T_{thresh,j}$.

By way of another example, the UE 115-*a* may determine to operate in the second power state based on determining that a power level ($P_{UE}$) at the UE 115-*a* satisfies a threshold power level ($P_{thresh}$). The power level of the UE 115-*a* may include, but is not limited to, a battery level of the UE 115-*a*. In some cases, the power level may satisfy the threshold power level if the power level is less than or equal to the threshold power level. In this regard, the UE 115-*a* may determine to operate in the second power state based on determining that the power level of the UE 115-*a* is less than or equal to a threshold power level (e.g., $P_{UE} \leq P_{thresh}$).

In some aspects, the UE 115-*a* may determine one or more parameters associated with the set of receive ports of the UE 115-*a*. Parameters associated with the set of receive ports may include, but are not limited to, a received signal strength indicator (RSSI) metric, a reference signal received power (RSRP) metric, a reference signal received quality (RSRQ) metric, a SNR, a SINR, or any combination thereof. In some aspects, the UE 115-*a* may determine the parameters of the receive ports based on transmitting the capability report 210, receiving the first configuration 220-*a*, communicating with the base station 105-*a* according to the first configuration 220-*a* (e.g., transmitting SRSs 225-*a*), or any combination thereof.

For example, in cases where the first configuration 220-*a* indicates that the UE 115-*a* is to communicate with the base station 105-*a* using a set of four receive ports, the UE 115-*a* may receive signals from the base station 105-*a* using each receive port of the set of four receive ports. In this example, the UE 115-*a* may perform measurements (e.g., RSSI measurements, RSRP measurements, RSRQ measurements, SNR measurements, SINR measurements) on signals received using each of the respective receive ports. In this regard, the UE 115-*a* may be configured to determine relative strengths or qualities of signals received using each of the respective receive ports.

In some aspects, the UE 115-*a* may be configured to select a subset of receive ports of the set of receive ports of the UE 115-*a*. More particularly, the UE 115-*a* may be configured to select a subset of receive ports of the UE 115-*a*, and may be configured to select a subset of transmit ports corresponding to the selected subset of receive ports of the UE 115-*a*. In some aspects, the UE 115-*a* may be configured to select the set of receive ports of the UE 115-*a* based on the determined parameters of the receive ports, based on determining to operate in the second power state, or both.

For example, the UE 115-*a* may be configured to select a subset of receive ports from the set of receive ports which may be associated with a highest signal strength or quality. For instance, in cases where the first configuration 220-*a* is associated with four receive ports, the UE 115-*a* may be configured to select a subset of receive ports (e.g., one or two receive ports) which are associated with the highest RSSI metrics, the highest RSRP metrics, the highest RSRQ metrics, the highest SNRs, the highest SINRs, or any combination thereof. Furthermore, the UE 115-*a* may be configured to select a subset of transmit ports which correspond to the selected subset of receive ports. For instance, in cases where the UE 115-*a* selects a first receive port and a second receive port out of the set of four receive ports, the UE 115-*a* may additionally be configured to select a first transmit port corresponding to the first receive port and a second transmit port corresponding to the second receive port.

In some aspects, the UE 115-*a* may communicate with the base station 105-*a* using less than all of the set of transmit ports for SRSs 225-*b* during a second time interval (e.g., second TTI, second slot, second subframe) following the first time interval. In some aspects, the UE 115-*a* may communicate with the base station 105-*a* using less than all of the set of transmit ports for SRSs 225-*b* based on transmitting the capability report 210, receiving the first configuration 220-*a*, communicating with the base station 105-*a* according to the first configuration 220-*a* (e.g., transmitting SRSs 225-*a*), determining to operate in the second power state, determining the parameters associated with the set of receive ports, selecting the subset of receive and/or transmit ports, or any combination thereof.

For example, the UE 115-a may communicate with the base station 105-a using less than all of the set of transmit ports for SRSs 225-b during a second time interval based on determining that a thermal state at the UE 115-a satisfies a threshold thermal state (e.g., based on $T_{skin} \geq T_{thresh,skin}$, $T_j \geq T_{thresh,j}$) at time $T_1$. Additionally or alternatively, the UE 115-a may communicate with the base station 105-a using less than all of the set of transmit ports for SRSs 225-b during a second time interval based on determining that a power level at the UE 115-a satisfies a threshold power level (e.g., based on $P_{UE} \leq P_{thresh}$), or any combination thereof.

In some aspects, the UE 115-a may communicate with the base station 105-a using less than all of the set of transmit ports for SRSs 225-b in order to induce the base station 105-a into scheduling transmissions at the UE 115-a which are associated with a lower rank (e.g., reduced quantity of layers). In turn, by inducing the base station 105-a to schedule transmissions which are associated with a lower rank, the UE 115-a may be able to adjust an operational state of one or more receive ports (e.g., deactivate one or more receive ports) of the UE 115-a in order to reduce a power consumption at the UE 115-a, thereby reducing a thermal state at the UE 115-a. Accordingly, in some cases, the UE 115-a may communicate with the base station 105-a using less than all of the set of transmit ports for SRSs 225-b based on determining to operate in the second power state (e.g., based on determining to operate in the second power state at time $T_1$) in order to reduce power consumption, conserve a power level (e.g., battery level), and reduce a thermal state (e.g., reduce $T_{skin}$, $T_j$) at the UE 115-a.

For example, the UE 115-a may be configured to refrain from transmitting SRSs 225-b on all transmit ports of a set of transmit ports at the UE 115-a during the second time interval. For instance, in cases where the UE 115-a includes a set of four receive ports, and therefore a set of four transmit ports corresponding to the four receive ports, the UE 115-a may refrain from transmitting SRSs 225-b on each transmit port of the set of four transmit ports. In this regard, the UE 115-a may wholly refrain from transmitting any SRSs 225-b on the set of transmit ports.

By way of another example, the UE 115-a may be configured to transmit SRSs 225-b on a subset of transmit ports of the set of transmit ports at the UE 115-a during the second time interval. For instance, in cases where the UE 115-a includes a set of four receive ports, and therefore a set of four transmit ports corresponding to the four receive ports, the UE 115-a may transmit SRSs 225-b on one, two, or three transmit ports of the set of four transmit ports. In this regard, the UE 115-a may refrain from transmitting SRSs 225-b on one or more transmit ports of the set of transmit ports.

As noted previously herein, In the base station 105-a may be configured to measure a channel quality (e.g., determine a CQI and/or rank) associated with communications between the UE 115-a and the base station 105-a based on the received SRSs 225-a, 225-b. In this regard, communicating with the base station 105-a using less than all the transmit ports for SRSs 225-b (e.g., refraining from transmitting SRSs 225-b, transmitting SRSs 225-b using a subset of transmit ports) may result in different estimations of channel quality at the base station 105-a, which may be used to induce the base station 105-a to reduce a quantity of layers associated with scheduled transmissions.

Moreover, the quantity of transmit ports of the subset of transmit ports on which the SRSs 225-b are transmitted may be based on a level of reduction of desired power consumption and/or thermal mitigation at the UE 115-a. In particular, reducing the quantity of transmit ports on which the SRSs 225-b are transmitted may induce the base station 105-a to reduce the rank of scheduled transmissions, thereby corresponding to larger reductions in power consumption at the UE 115-a. In this regard, completely refraining from transmitting SRSs 225-b on the set of transmit ports may be associated with larger reductions in power consumption at the UE 115-a. Similarly, transmitting SRSs 225-b on a single transmit port may result in a further reduction of a rank of scheduled transmissions as compared to transmitting SRSs 225-b on two transmit ports, and may therefore result in larger reductions of power consumption at the UE 115-a. Therefore, the quantity of transmit ports on which the UE 115-a transmits SRSs 225-b may be based on a desired level of reduction of power consumption at the UE 115-a.

In some cases, in addition to performing SRS-AS techniques in which the UE 115-a reduces a quantity of transmit ports on which SRSs 225-b are transmitted, the UE 115-a may additionally adjust parameters reported to the base station 105-a via a CSF report 230 in order to further induce the base station 105-a to reduce a rank (e.g., quantity of layers) associated with transmissions scheduled at the UE 115-a. In this regard, the UE 115-a may use a combination of SRS-AS techniques and CSF spoofing techniques in order to reduce a rank of scheduled transmissions, and therefore reduce power consumption and reduce temperatures (e.g., $T_{skin}$, $T_j$) at the UE 115-a.

For example, the UE 115-a may determine a rank, a CQI, or both, associated with communications between the UE 115-a and the base station 105-a using one or more receive ports. In some aspects, the UE 115-a may determine the rank and/or CQI associated with communications with the base station 105-a using one or more receive ports based on determining to operate in the second power state. Upon determining the rank and/or CQI associated with communications between the UE 115-a and the base station 105-a, the UE 115-a may selectively adjust the determined rank, the determined CQI, or both. In some aspects, the UE 115-a may selectively adjust the determined rank and/or the determined CQI based on determining to operate in the second power state.

The UE 115-a may be configured to selectively adjust the rank and/or CQI in order to further induce the base station 105-a to reduce a rank (e.g., quantity of layers) associated with transmissions scheduled at the UE 115-a, which may result in reduced power consumption and reduced temperatures at the UE 115-a. For example, the UE 115-a may determine a rank associated with communications with the base station 105-a using the set of receive ports by determining that it may support up to four layers of communications (e.g., rank 4). In this example, the UE 115-a may selectively adjust the determined rank to generate an adjusted rank which is less than the determined rank (e.g., rank 3, rank 2, rank 1). The adjusted rank may subsequently be reported to the base station 105-a vis a CSF report 230 in order to induce the base station 105-a to reduce a rank associated with transmissions scheduled at the UE 115-a based on the adjusted rank.

By way of another example, the UE 115-a may determine a CQI associated with communications with the base station 105-a using the set of receive ports of the UE 115-a. In this example, the UE 115-a may selectively adjust the determined CQI to generate an adjusted CQI which is less than the determined CQI (e.g., lower quality CQI). In this regard, the UE 115-a may be configured to artificially adjust a determined rank and/or a determined CQI in order to reduce a quantity of layers of communications scheduled at the UE 115-a.

Subsequently, the UE 115-a may transmit a CSF report 230 to the base station 105-a. In some aspects, the CSF report 230 may include an indication of the adjusted rank, the adjusted CQI, or both. In this regard, the UE 115-a may transmit the CSF report 230 based determining to operate in the second power state and selectively adjusting the determined rank and/or determined CQI.

In some aspects, the UE 115-a may selectively adjust the rank and/or CQI which is reported to the base station 105-a at 450 via the CSF report 230 in order to induce the base station 105-a to reduce a quantity of layers associated with transmissions scheduled at the UE 115-a. For instance, by reporting the adjusted rank (e.g., lowered rank) to the base station 105-a via the CSF report 230, the base station 105-a may be configured to determine that the UE 115-a is not capable of supporting higher quantities of layers, and may therefore reduce the rank of transmissions scheduled at the UE 115-a base on the adjusted rank. Similarly, by reporting the adjusted CQI (e.g., lowered CQI) to the base station 105-a via the CSF report 230, the base station 105-a may be configured to determine that the UE 115-a is experiencing poor CQI, and may therefore reduce the rank of transmissions scheduled at the UE 115-a base on the adjusted CQI.

In some aspects, the UE 115-a may use a combination of CSF spoofing techniques and SRS-AS techniques in order to induce the base station 105-a to reduce a rank (e.g., quantity of layers) associated with transmissions scheduled at the UE 115-a. For example, according to some conventional techniques, the UE 115-a may perform CSF spoofing techniques in which the UE 115-a reports selectively adjusted (e.g., selectively reduced) rank and/or CQI to the base station 105-a via a CSF report 230. However, in some cases, instead of simply reducing the rank of scheduled transmissions based on the adjusted rank and/or CQIs, the base station 105-a may instead instruct the UE 115-a to transmit SRSs so that the base station 105-a may directly determine the rank and/or CQI of wireless communications between the UE 115-a and the base station 105-a. In such cases, if the UE 115-a were not to perform the SRS-AS techniques described herein, the base station 105-a may determine that the adjusted rank and/or CQI values reported to the base station 105-b are inaccurate, and may therefore refrain from reducing the rank of scheduled transmissions. Accordingly, some techniques described herein may use a combination of CSF spoofing techniques and SRS-AS techniques to increase the likelihood that the base station 105-a may be induced into reducing a rank of transmissions scheduled at the UE 115-a.

In some aspects, the UE 115-a may receive an indication of a second configuration 220-b from the base station 105-a. As noted previously herein, the second configuration 220-b may indicate one or more parameters associated with wireless communications between the UE 115-a and the base station 105-a including a transmission-reception mode which is to be used at the UE 115-a, a quantity of transmission ports and/or reception ports to be used by the UE 115-a, or both. For example, the second configuration 220-b may indicate for the UE 115-a to communicate with the base station 105-a using a first subset of receive ports of the set of receive ports at the UE 115-a. The second configuration 220-b may be indicated to the UE 115-a via a control message (e.g., RRC message, DCI message, MAC-CE message).

In some aspects, the UE 115-a may receive the second configuration 220-b based on communicating with the base station 105-a using less than all the transmit ports for the SRSs 225-b, receiving the CSF report 230, or both. For example, the UE 115-a may receive the second configuration 220-b based on refraining from transmitting the SRSs 225-b on all the transmit ports of the UE 115-a (e.g., refraining from transmitting any SRSs 225-b). By way of another example, the UE 115-a may receive the second configuration 220-b based on transmitting SRSs on a subset of transmit ports corresponding to a subset of receive ports of the UE 115-a. Furthermore, in some cases, the UE 115-a may receive the second configuration 220-b based on communicating with the base station 105-a using less than all the transmit ports for SRSs 225-b in conjunction with reporting the selectively adjusted (e.g., selectively reduced) rank and/or CQI to the base station 105-a via the CSF report 230.

In some aspects, the second configuration 220-b may indicate for the UE 115-a to communicate with the base station 105-a using a first subset of receive ports of the set of receive ports at the UE 115-a. In this regard, the second configuration 220-b may reduce a quantity of receive ports used at the UE 115-a relative to the first configuration 220-a. For example, the first configuration 220-a may indicate for the UE 115-a to use a set of four receive ports at the UE 115-a. Subsequently, the UE 115-a may transmit the SRSs 225-b using a first transmit port and a second transmit port corresponding to a first receive port and a second receive port, respectively. In this example, the second configuration 220-b may indicate for the UE 115-a to use the first receive port and the second receive port corresponding to the first transmit port and the second transmit port. In this regard, the second configuration 220-b may reduce a quantity of receive ports used by the UE 115-a from four receive ports to two receive ports (e.g., 2Rx fallback).

Accordingly, the UE 115-a may be configured to implement receive port fallback (e.g., 2Rx fallback, 1Rx fallback) to reduce power consumption at the UE 115-b by refraining from transmitting SRSs 225-b altogether, transmitting SRSs 225-b using a subset of transmit ports corresponding to a subset of receive ports, transmitting the CSF report including selectively adjusted rank values, CQI values, or any combination thereof.

In some aspects, the UE 115-a may selectively adjust one or more parameters associated with a second subset of receive ports of the UE 115-a. In some aspects, the UE 115-a may selectively adjust the one or more parameters associated with the second subset of receive ports in order to operate in the second power state (e.g., reduced power state). Parameters associated with the second subset of receive ports which may be adjusted may include parameters associated with low-noise amplifiers (LNAs), phase shifters, or both. In some cases, the UE 115-a may selectively adjust one or more parameters associated with the second subset of receive ports in order to adjust an operational state (e.g., deactivate) the second subset of receive ports, which may thereby reduce power consumption and/or temperate at the UE 115-a. In some aspects, the UE 115-a may selectively adjust the parameters associated with the second subset of receive ports based on receiving the second configuration 220-b at 450.

For example, as noted previously herein, the first configuration 220-a may indicate for the UE 115-a to use a set of four receive ports at the UE 115-a (e.g., first receive port, second receive port, third receive port, fourth receive port). Subsequently, the second configuration 220-b may indicate for the UE 115-a to use the second receive port and the fourth receive port based on identifying that SRSs 225-b were not transmitted/received, based on identifying that the SRSs 225-b were transmitted using a subset of transmit ports, based on the CSF report 230, or any combination thereof. Thus, first subset of receive ports indicated by the second configuration 220-b may include the second and fourth receive ports. In this example, the UE 115-a may selectively adjust parameters associated with the first and third receive ports (e.g., a second subset of receive ports) in order to reduce a power consumption of the first and third receive ports. For instance, the UE 115-a may deactivate the first and third receive ports by selectively adjusting parameters associated with LNAs, phase shifters, and/or other components of the first and third receive ports.

By inducing the base station 105-a to transmit the second configuration 220-b which instructs the UE 115-a to communicate using a subset of receive ports, the techniques described herein may be used by the UE 115-a to effectively reduce a rank of transmissions scheduled at the UE 115-a. Therefore, by effectively reducing a rank of scheduled transmissions, techniques described herein may enable the UE 115-a to deactivate a subset of receive ports, which may enable the UE 115-a to enter a lower operational power state, reduce power consumption at the UE 115-a, and reduce a temperature (e.g., reduce $T_{skin}$ and/or $T_j$) at the UE 115-a. Such power savings techniques may enable the UE 115-a to reduce power consumption at both a modem baseband of the UE 115-a and a radio frequency transceiver of the UE 115-a.

Subsequently, the UE 115-a may communicate with the base station 105-a according to the second configuration 220-b. In this regard, the UE 115-a may communicate with the base station 105-a by receiving signals using the first subset of receive ports indicated in the second configuration 220-b. Moreover, the UE 115-a may communicate with the base station 105-a by transmitting SRSs 225 using a subset of transmit ports corresponding to the first subset of receive ports indicated in the second configuration 220-b. Accordingly, the UE 115-a may communicate with the base station 105-a according to the second configuration 220-b using a lower quantity of layers (e.g., reduced rank) as compared to communications which were carried out according to the first configuration 220-a.

The UE 115-a may communicate base station 105-a according to the second configuration 220-b based on receiving the second configuration 220-b, selectively adjusting the parameters associated with the second subset of receive ports, or both. For example, the second configuration 220-b may indicate for the UE 115-a to use a first subset of receive ports including a first receive port and a third receive port. Subsequently, the UE 115-a may deactivate a second receive port and a fourth receive port in order to enter the second power state (e.g., reduced power state). In this example, the UE 115-a may communicate with the base station 105-a according to the second configuration 220-b by receiving downlink transmissions from the base station 105-a using the first and third receive ports. In this example, the UE 115-a may be configured to decode two layers of downlink transmissions (e.g., two layers of PDSCH transmissions) using the first and third receive ports.

In some aspects, the UE 115-a may subsequently induce the base station 105-a to increase a quantity of layers associated with transmissions scheduled at the UE 115-a. For example, while communicating with the base station 105-b according to the second configuration 220-b, the UE 115-a may subsequently determine that it may return to the first power state (e.g., the default power state, or other power state) which is higher than the second power state. The UE 115-a may determine to return the first power state based on determining that the thermal state of the UE 115-a no longer satisfies the threshold thermal state (e.g., based on determining $T_{skin} < T_{thresh,skin}$, and/or $T_j < T_{thresh,j}$) or another thermal state, based on determining that the power level (e.g., battery level) of the UE 115-a no longer satisfies the threshold power level (e.g., based on determining $P_{UE} > P_{thresh}$), or both.

For example, as shown in the graph illustrated in FIG. 2, the UE 115-a may implement thermal mitigation and power savings techniques at some time after time $T_1$ (e.g., based on a thermal state T satisfying a threshold thermal state $T_{thresh}$), as described previously herein. The UE 115-a may then transition to the second power state at some time after time $T_1$, which may reduce a thermal state (e.g., reduce a temperature) of the UE 115-b. In this example, the UE 115-a may determine that it may switch back to the first power state (e.g., normal or default power state) based on identifying that a thermal state of the UE 115-a fails to satisfy the threshold thermal state, based on identifying that the thermal state satisfies a different threshold thermal state, or both.

For example, referring to the graph illustrated in FIG. 2, the UE 115-a may determine to operate in (e.g., return to) the first thermal state based on identifying that the thermal state (e.g., $T_{skin}$, $T_j$) fails to satisfy the threshold thermal state ($T_{thresh}$). For instance, the UE 115-a may determine to operate in (e.g., return to) the first thermal state based on identifying that the thermal state is less than the threshold thermal state (e.g., operate in first power state if $T_{skin} < T_{thresh}$, or $T_j < T_{thresh}$).

By way of another example, continuing with reference to the graph illustrated in FIG. 2, the UE 115-a may determine to operate in (e.g., return to) the first thermal state based on identifying that the thermal state (e.g., $T_{skin}$, $T_j$) satisfies a second threshold thermal state ($T_{thresh,2}$) which is different from (e.g., lower than) the threshold thermal state $T_{thresh}$. In some cases, the thermal state at the UE 115-a may satisfy the second threshold thermal state if the thermal state is less than or equal to the second thermal state. For instance, the UE 115-a may determine to operate in (e.g., return to) the first thermal state based on identifying that the thermal state at the UE 115-a is less than or equal to the second threshold thermal state (e.g., operate in first power sate if $T_{skin} \leq T_{thresh,2}$, or $T_j \leq T_{thresh,2}$). By comparing the thermal state at the UE 115-a to the second thermal state $T_{thresh,2}$ which is lower than the first thermal state $T_{thresh}$, the thermal mitigation techniques described herein may ensure that the UE 115-a has an opportunity to sufficiently cool before the UE 115-a returns to the first power state (e.g., normal or default power state).

Upon determining that the UE 115-a is to operate in the first power state, the UE 115-a may transmit SRSs 25 using an increased quantity of transmit ports corresponding to an increased quantity of receive ports. For example, in cases where the second configuration 220-b includes two receive ports (e.g., 2Rx), the UE 115-a may transmit SRSs using four transmit ports corresponding to the four receive ports (e.g., 4Rx) in order to induce the base station 105-a to increase the quantity of layers associated with transmissions scheduled at the UE 115-a. Additionally or alternatively, the UE 115-a may transmit a CSF report 230 which indicates a higher rank and/or higher CQI (e.g., rank 4) in order to further induce the base station 105-a to increase the quantity of layers associated with transmissions scheduled at the UE 115-a.

The UE 115-a may implement the power-savings techniques described herein for a limited duration of time until such power-savings techniques are no longer necessary. In other words, the UE 115-a may implement the techniques described herein to reduce the power level at the UE 115-a, correspondingly reducing a power consumption and/or temperature of the UE 115-a. Subsequently, when the temperature (e.g., $T_{skin}$, $T_j$) of the UE 115-a falls below a threshold temperature (e.g., $T_{thresh,skin}$, $T_{thresh,j}$, $T_{thresh,2}$) and/or when the power level (e.g., $P_{UE}$, battery level) of the UE 115-a rises above the threshold power level (e.g., $P_{thresh}$), the UE 115-a may transmit SRSs 225 and/or transmit a CSF report 230 in order to return to the first power state and/or the first configuration 220-a.

The techniques described herein may enable the UE 115-a to reduce a power state at the UE 115-a, correspondingly reducing a power consumption at the UE 115-a and reducing a temperature at the UE 115-a. In particular, techniques described herein may enable the UE 115-a to perform SRS-AS in which the UE 115-a refrains from transmitting SRSs 225-b and/or transmits SRSs 225-b using a subset of transmit ports in order to induce the base station 105-a to reduce a rank of scheduled transmissions. In this regard, by inducing the base station 105-a to reduce a rank of scheduled transmissions, the UE 115-a may be able to deactivate one or more receive ports at the UE 115-a, thereby enabling the UE 115-a to enter a lower power state, reduce power consumption, and reduce a temperature at the UE 115-a. Such thermal mitigation and power savings techniques may enable the UE 115-a to reduce power consumption at both modem baseband and radio frequency transceiver components of the UE 115-a.

Figure 3A:
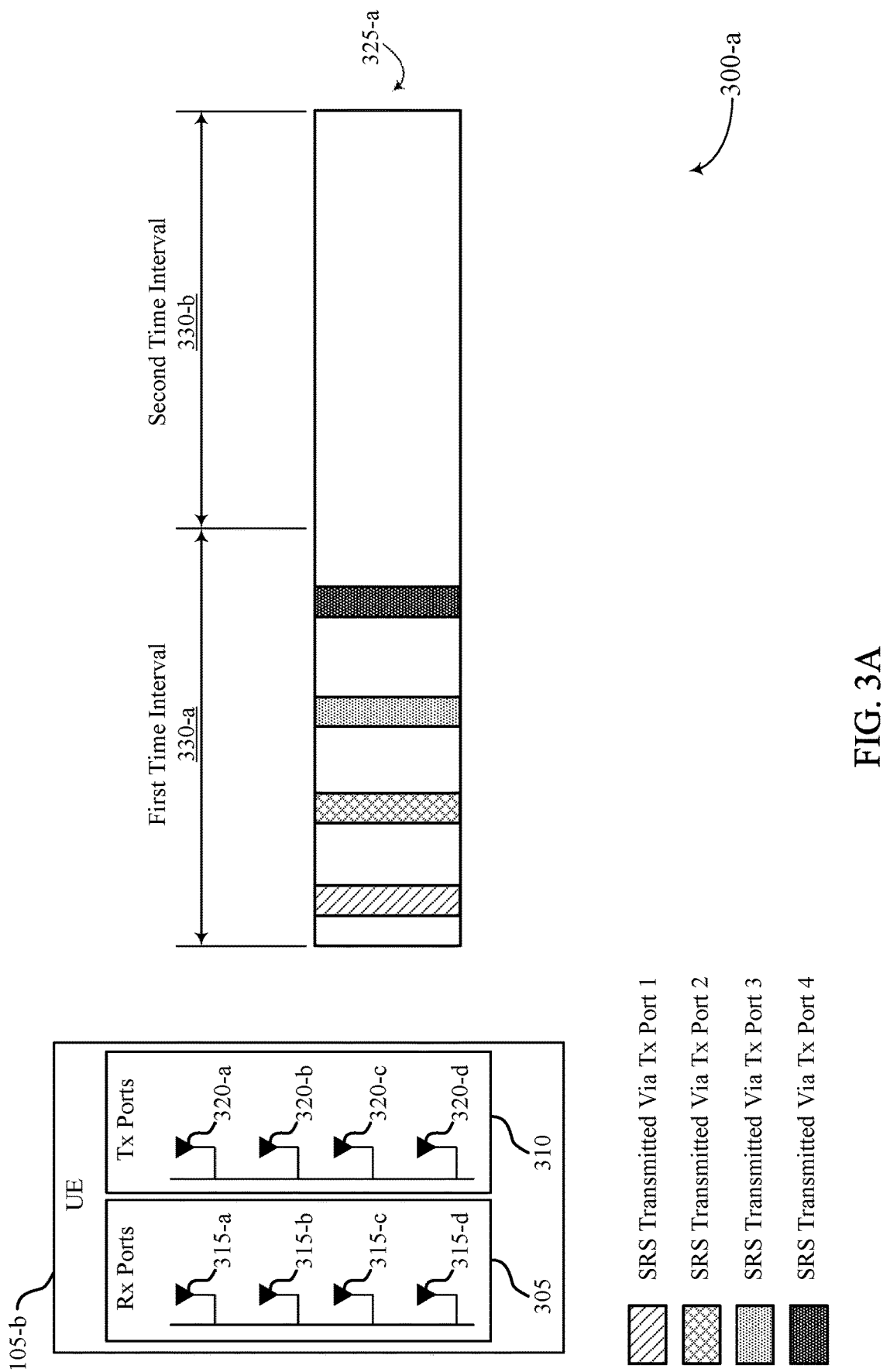
FIGS. 3A and 3B illustrate examples of communications schemes that support techniques for thermal mitigation and power saving in accordance with aspects of the present disclosure.
Figure 3B:
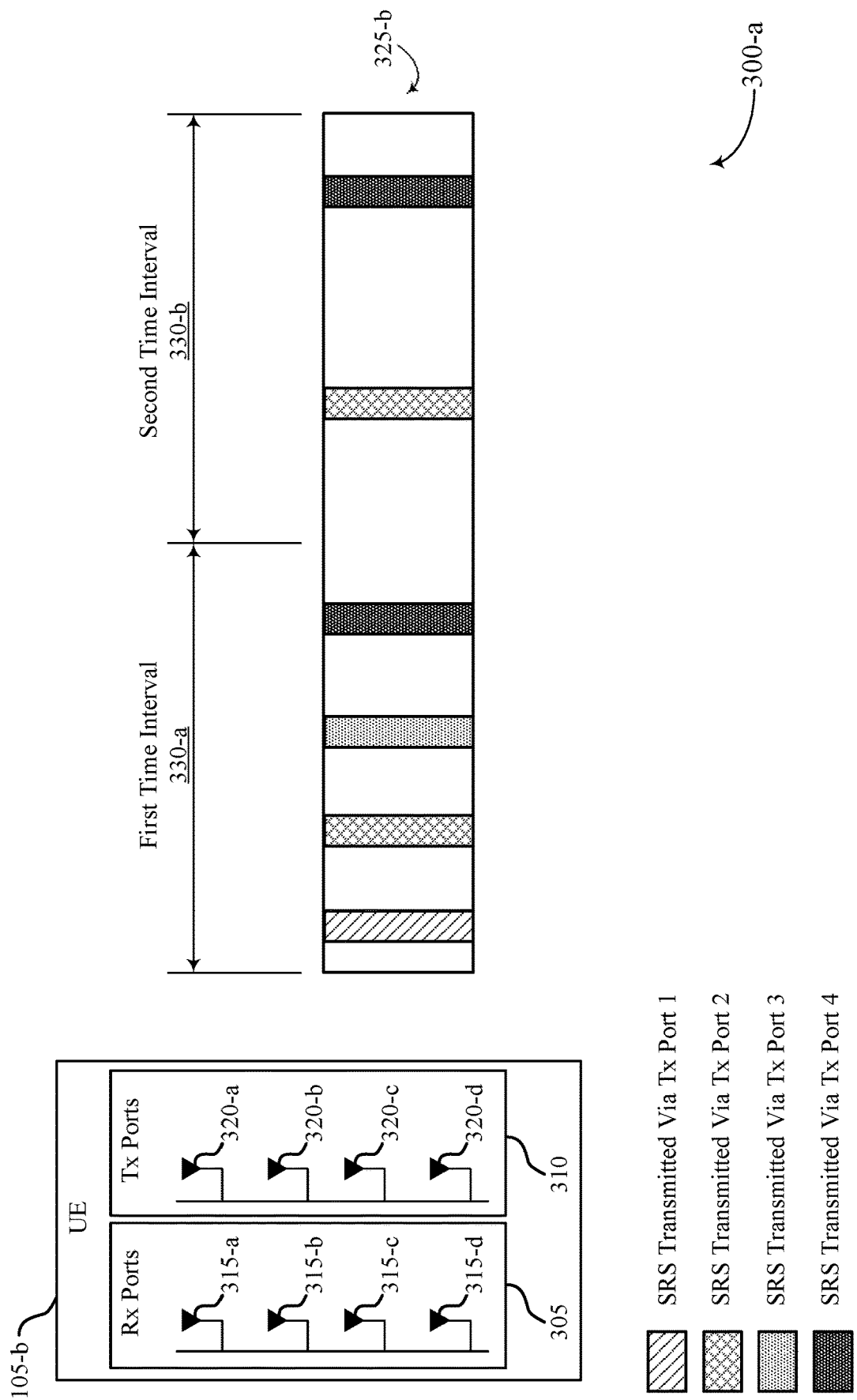

FIGS. 3A and 3B illustrate examples of a communication scheme 300-a and a communication scheme 300-b, respectively, that support techniques for thermal mitigation and power saving in accordance with aspects of the present disclosure. In some examples, the communication scheme 300-a and/or communication scheme 300-b may implement, or be implemented by, aspects of wireless communications system 100, wireless communications system 200, or both.

In some aspects, FIGS. 3A and 3B may illustrate components of a UE 115-b, which may include examples of UEs 115 shown and described with reference to FIGS. 1 and 2. In some aspects, the UE 115-b may include a set of receive ports 305 including one or more receive ports 315. For example, the UE 115-b may include a set of receive ports 305 including a first receive port 315-a, a second receive port 315-b, a third receive port 315-c, and a fourth receive port 315-d (e.g., 4Rx). Similarly, the UE 115-b may include a set of transmit ports 310 including one or more transmit ports 320. For example, the UE 115-b may include a set of transmit ports 310 including a first transmit port 320-a, a second transmit port 320-b, a third transmit port 320-c, and a fourth transmit port 320-d (e.g., 4Tx). In this regard, the UE 115-b may be configured to support multiple transmission-reception modes (e.g., 1T4R, 2T4R, etc.). It is noted herein, however, that the UE 115-b may include any quantity of receive ports 315 and/or any quantity of transmit ports 320 in order to support additional transmission-reception modes.

In some aspects, each receive port 315 of the set of receive ports 305 may correspond to a transmit port 320 of the set of transmit ports 310, and vice versa. For example, the first receive port 315-a may correspond to the first transmit port 320-a, the second receive port 315-b may correspond to the second transmit port 320-b, the third receive port 315-c may correspond to the third transmit port 320-c, and the fourth receive port 315-d may correspond to the fourth transmit port 320-d. In some aspects, each of the respective transmit ports 320 may be configured to sound SRSs (e.g., transmit SRSs) for each of the respective corresponding receive ports 315 (e.g., first transmit port 320-a sounds SRSs for first receive port 315-a, second transmit port 320-b sounds SRSs for second receive port 315-b, and the like).

According to some implementations, the UE 115-b may be configured to communicate with a base station 105 according to a first configuration using the set of receive ports 305 during a first time interval, and may subsequently communicate with the base station 105 using less than all of the set of transmit ports 310 for SRSs during a second time interval in order to induce the base station 105 to reduce a rank of transmissions scheduled at the UE 115-b.

For example, while operating in a first power state (e.g., normal or default power state), the UE 115-a may receive an indication of a first configuration for communications between the UE 115-b and the base station 105. The first configuration may indicate one or more parameters associated with wireless communications between the UE 115-b and the base station 105 including a transmission-reception mode which is to be used at the UE 115-b, a quantity of transmission ports 320 and/or reception ports 315 to be used by the UE 115-b, or both. For example, the first configuration may indicate that the UE 115-b is to communicate with the base station 105 using each receive port 315 of the set of receive ports 305 of the UE 115-c (e.g., indicate 4Rx).

Subsequently, as shown in a communications configuration 325-a illustrated in FIG. 3A, and a communications configuration 325-b illustrated in FIG. 3B, the UE 115-b may communicate with the base station 105-b according to the first configuration during a first time interval 330-a (e.g., first TTI, first slot, first subframe). For instance, in cases where the first configuration indicates for the UE 115-b to communicate with the base station 105 using all four receive ports 315 of the set of receive ports 305, the UE 115-b may transmit, during the first time interval 330-a, SRSs on each transmit port 320 of the set of transmit ports 310 corresponding to each receive port 315 of the set of receive ports 305. For instance, as shown in communications configurations 325-a and 325-b, the UE 115-a may transmit SRSs using each of the first transmit port 320-a, the second transmit port 320-b, the third transmit port 320-c, and the fourth transmit port 320-d.

The SRSs transmitted according to the first configuration in the first time interval 330-a are shown as being transmitted at different times within the first time interval 330-a. However, in additional or alternative cases, the SRSs transmitted (e.g., sounded) in the first time interval 330-a may be transmitted such that they at least partially overlap with one another in the time domain. In this regard, the SRSs may be transmitted according to different modulation schemes, within different frequency bands (e.g., different carriers, different component carriers), or any combination thereof, such that the transmission of two or more SRSs at least partially overlap with one another in the time domain. For example, the UE 115-b may transmit a first SRS via the first transmit port 320-a and a second SRS via the second transmit port 320-b. In this example, the first SRS may be transmitted on a first carrier and the second SRS may be transmitted on a second carrier, where the first SRS and the second SRS at least partially overlap in the time domain.

At some time during or after the first time interval 330-a, the UE 115-a may determine to operate in a second power state that is lower than the first power state. In other words, the UE 115-b may determine to operate in the second power state (e.g., reduced power state) that is lower than the first power state based on determining that one or more trigger conditions for transitioning to a reduced power state have been satisfied. As noted previously herein, the UE 115-*b* may determine to operate in the second power state based on any quantity of parameters or characteristics including, but not limited to, a thermal state at the UE 115-*b*, a power level (e.g., battery level) at the UE 115-*b*, or both.

In some aspects, upon determining to operate in the second power state, the UE 115-*b* may communicate with the base station 105 within a second time interval 330-*b* following the first time interval 330-*a* using less than all of the transmit ports 320 for SRSs. For example, as shown in the communications configuration 325-*a* illustrated in FIG. 3A, the UE 115-*b* may refrain from transmitting SRSs on all transmit ports 320 of the set of transmit ports 310 during the second time interval 330-*b*. As such, in some examples, the UE 115-*a* may completely refrain from transmitting SRSs during the second time interval 330-*b*.

By refraining from transmitting SRSs on all transmit ports 320 of the set of transmit ports 320 during the second time interval 330-*b*, as shown in the communications configuration 325-*a*, the UE 115-*b* may be configured to induce the base station 105 to reduce rank (e.g., reduce a quantity of layers) associated with transmissions scheduled at the UE 115-*b*. Accordingly, by inducing the base station 105 to reduce the rank and/or quantity of layers of scheduled transmissions, techniques described herein may enable the UE 115-*b* to enter the second power state (e.g., lower power state) by turning off, deactivating, or otherwise disabling one or more receive ports 315 of the set of receive ports 305. Therefore, by enabling the UE 115-*b* to deactivate one or more receive ports 315 and operate in the second power state, techniques described herein may enable the UE 115-*b* to reduce a thermal state (e.g., skin temperature, junction temperature) at the UE 115-*c*, reduce power consumption, and conserve power.

For example, by refraining from transmitting SRSs in the second time interval 330-*b*, the UE 115-*b* may induce the base station to reduce scheduled transmissions to a rank two (e.g., two layers), thereby enabling the UE 115-*b* to disable two receive ports 315 of the set of receive ports 305 (e.g., 2Rx fallback). By way of another example, by refraining from transmitting SRSs in the second time interval 330-*b*, the UE 115-*b* may induce the base station to reduce scheduled transmissions to a rank one (e.g., one layer), thereby enabling the UE 115-*b* to disable three receive ports 315 of the set of receive ports 305 (e.g., 1Rx fallback).

In additional or alternative implementations, the UE 115-*b* may be configured to induce the base station 105 to reduce a rank of scheduled transmissions by transmitting SRSs on a subset of transmit ports 320. For example, as shown in the communications configuration 325-*b* illustrated in FIG. 3B, the UE 115-*b* may transmit SRSs, during the second time interval, using less than all the transmit ports 320 of the set of transmit ports 310. For instance, as shown in FIG. 3B, the UE 115-*b* may transmit a first SRS via the second transmit port 320-*b* and a second SRS via the fourth transmit port 320-*d* during the second time interval 330-*b* (e.g., refrain from transmitting SRSs on the first transmit port 320-*a* and the third transmit port 320-*c*).

By transmitting SRSs on less than all transmit ports 320 of the set of transmit ports 320 during the second time interval 330-*a*, as shown in the communications configuration 325-*a*, the UE 115-*b* may be configured to induce the base station 105 to reduce rank (e.g., reduce a quantity of layers) associated with transmissions scheduled at the UE 115-*b*. Accordingly, by inducing the base station 105 to reduce the rank and/or quantity of layers of scheduled transmissions, techniques described herein may enable the UE 115-*b* to enter the second power state (e.g., lower power state) by turning off, deactivating, or otherwise disabling one or more receive ports 315 of the set of receive ports 305. Therefore, by enabling the UE 115-*b* to deactivate one or more receive ports 315 and operate in the second power state, techniques described herein may enable the UE 115-*b* to reduce a thermal state (e.g., skin temperature, junction temperature) at the UE 115-*c*, reduce power consumption, and conserve power.

In some aspects, the UE 115-*b* may be configured to select which transmit ports 320 will be used to transmit SRSs during the second time interval 330-*b* based on one or more parameters associated with the set of receive ports 305, the set of transmit ports 310, or both. Parameters associated with the set of receive ports 305 may include, but are not limited to, an RSSI metric, an RSRP metric, an RSRQ metric, a SNR, a SINR, or any combination thereof.

For example, in cases where the first configuration indicates that the UE 115-*b* is to communicate with the base station 105 using each receive port 310 of the set of receive ports 305, the UE 115-*b* may receive signals from the base station 105 using each receive port 310 of the set of receive ports 305. In this example, the UE 115-*b* may perform measurements (e.g., RSSI measurements, RSRP measurements, RSRQ measurements, SNR measurements, SINR measurements) on signals received using each of the respective receive ports 310. In this regard, the UE 115-*b* may be configured to determine relative strengths or qualities of signals received using each of the respective receive ports 310.

Subsequently, the UE 115-*b* may be configured to select a subset of receive ports 310 of the set of receive ports 305. In some aspects, the UE 115-*b* may be configured to select the subset of receive ports 310 of the UE 115-*b* based on the determined parameters of the respective receive ports 310. In some cases, the UE 115-*b* may select a subset of receive ports 310 which are associated with a higher signal strengths, higher signal qualities, or both. Subsequently, the UE 115-*b* may transmit the SRSs within the second time interval 330-*b* using a subset of transmit ports 320 which correspond to the determined subset of receive ports 315.

For example, in cases where the first configuration is associated with each of the set of receive ports 305, the UE 115-*b* may determine that the second receive port 315-*b* and the fourth receive port 315-*d* may be associated with the highest RSSI metrics, the highest RSRP metrics, the highest RSRQ metrics, the highest SNRs, the highest SINRs, or any combination thereof. In this regard, the UE 115-*b* may select that the second and fourth receive ports 315 for inclusion within the subset of receive ports 315. The UE 115-*b* may be further configured to select a subset of transmit ports 320 which correspond to the selected subset of receive ports 315. For instance, in cases where the UE 115-*c* selects the second receive port 315-*b* and the forth receive port 315-*d* for inclusion within the subset of receive ports 315, the UE 115-*b* may additionally be configured to select the second transmit port 320-*b* corresponding to the second receive port 315-*b* and the fourth transmit port 320-*d* corresponding to the fourth receive port 315-*d*. Subsequently, as shown in communications configuration 325-*b*, the UE 115-*b* may then transmit SRSs within the second time interval using the second transmit port 320-*b* and the fourth transmit port 320-*d*.

Figure 4:
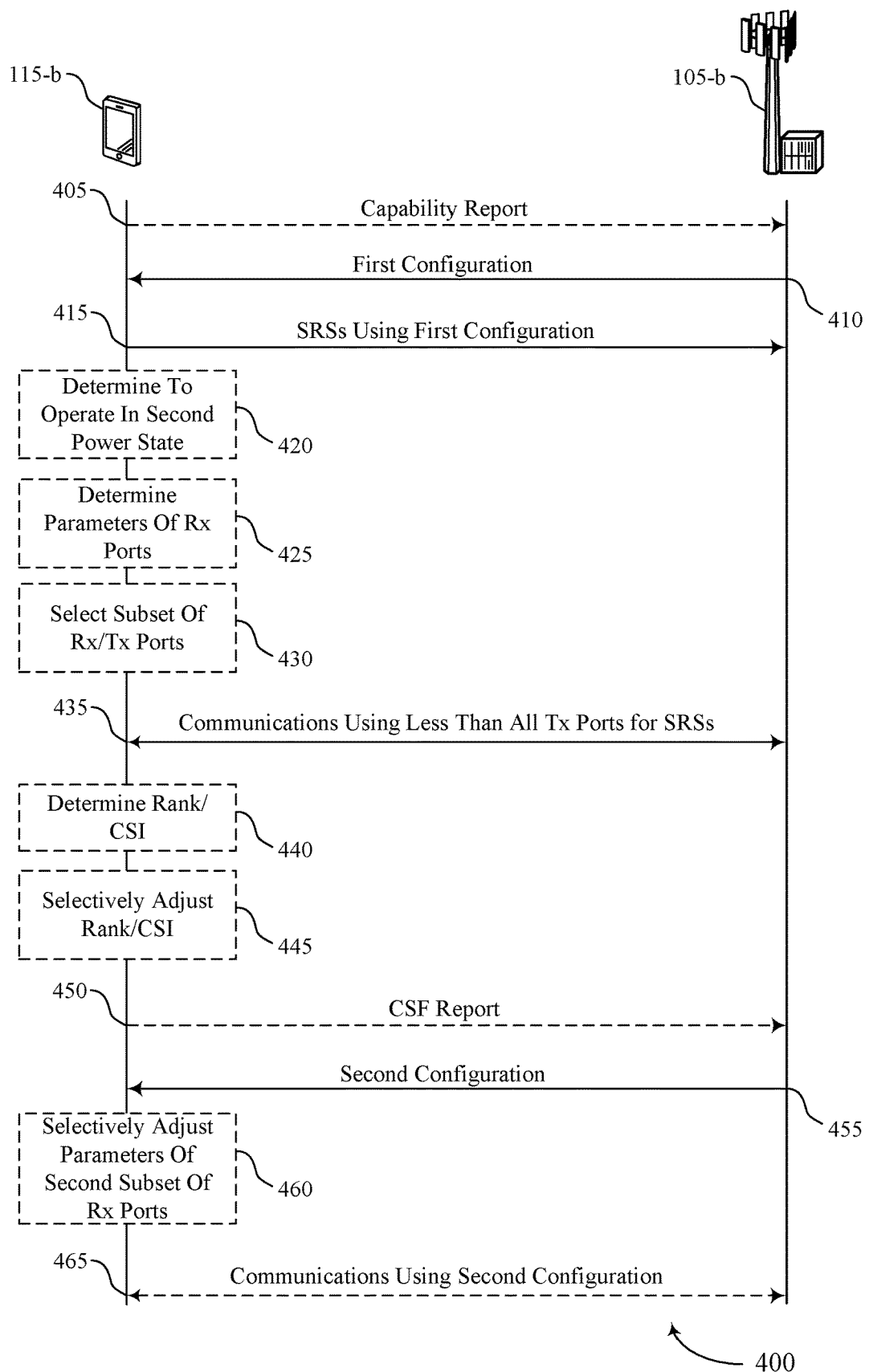
FIG. 4 illustrates an example of a process flow that supports techniques for thermal mitigation and power saving in accordance with aspects of the present disclosure.

FIG. 4 illustrates an example of a process flow 400 that supports techniques for thermal mitigation and power saving in accordance with aspects of the present disclosure. In some examples, process flow 400 may implement, or be implemented by, aspects of wireless communications system 100, wireless communications system 200, communications schemes 300-a and 300-b, or any combination thereof. For example, the process flow 400 may illustrate a UE 115-c transmitting SRSs according to a first configuration, determining to operate in a reduced power state, communicating with a base station 105-b using less than all transmit ports for SRSs, and receiving a second configuration for wireless communications with the base station 105-b, as described with reference to FIGS. 1-3. In some cases, process flow 400 may include a UE 115-c and a base station 105-b, which may be examples of corresponding devices as described herein.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-c may transmit a capability report to the base station 105-b. In some aspects, the capability report may include an indication of one or more transmission-reception modes supported by the UE 115-c. For example, the capability report may indicate that the UE 115-c supports a transmission-reception mode including one transmission port and four reception ports (e.g., 1T4R), a transmission-reception mode including two transmission ports and four reception ports (e.g., 2T4R), or both. The UE 115-c may be configured to supports any quantity or type of transmission-reception modes including any quantity of transmission ports, any quantity of reception ports, or both.

At 410, the base station 105-b may transmit an indication of a first configuration for communications between the UE 115-c and the base station 105-b. The first configuration may indicate one or more parameters associated with wireless communications between the UE 115-c and the base station 105-b including a transmission-reception mode which is to be used at the UE 115-c, a quantity of transmission ports and/or reception ports to be used by the UE 115-c, or both. For example, the first configuration may indicate that the UE 115-c is to use one or more transmission-reception modes which was indicated in the capability report transmitted at 405. The first configuration may be indicated to the UE 115-c via a control message (e.g., RRC message, DCI message, MAC-CE message).

In some aspects, the first configuration may indicate that the UE 115-c is to communicate with the base station 105-b using a set of receive ports of the UE 115-c. For example, the capability report transmitted by the UE 115-c may indicate that the UE 115-c supports a 1T4R transmission-reception mode (e.g., a transmission-reception mode including a set of four receive ports). In this example, the first configuration may indicate that the UE 115-c is to communicate with the base station 105-b using the set of four receive ports of the UE 115-c.

At 415, the UE 115-c may transmit SRSs on a set of transmit ports corresponding to the set of receive ports associated with the first configuration. In this regard, the UE 115-c may transmit SRSs according to the first configuration indicated at 410. In some cases, the UE 115-c may transmit the SRSs at 415 during a first time interval associated with a first power state of the UE 115-a. In some aspects, the base station 105-b may be configured to measure a channel quality (e.g., determine a CQI and/or rank) associated with communications between the UE 115-c and the base station 105-b based on the received SRSs. In some aspects, the UE 115-c may transmit the SRSs at 415 based on transmitting the capability report at 405, receiving the first configuration at 410, or both.

For example, the first configuration may indicate that the UE 115-c is to communicate with the base station 105-b using a set of four receive ports of the UE 115-c. As noted previously herein, each receive port of the set of receive ports may be associated with (e.g., correspond to) a respective transmit port at the UE 115-c. In other words, a first receive port may correspond to a first transmit port, a second receive port may correspond to a second transmit port, a third receive port may correspond to a third transmit port, and a fourth receive port may correspond to a fourth transmit port. In this example, the UE 115-c may transmit the SRSs at 415 according to the first configuration by transmitting the SRSs on the set of transmit ports (e.g., four transmit ports) corresponding to the set of receive ports (e.g., four receive ports) indicated in the first configuration.

In some aspects, the UE 115-c may transmit the SRSs at 415 in a first time interval (e.g., first TTI, first slot, first subframe) associated with a first power state of the UE 115-c (e.g., normal or default power state). In some cases, the UE 115-c may communicate with the base station 105-b while operating in the first power state (e.g., default power state) until one or more trigger conditions for transitioning to a second power state (e.g., lower or reduced power state) are satisfied. As described previously herein, the first power state may be associated with a higher power consumption level as compared to the second power state.

Additionally, the UE 115-c may receive one or more signals (e.g., reference signals) from the base station 105-b using (e.g., according to) the first configuration. For example, in cases where the first configuration indicates that the UE 115-c is to communicate with the base station 105-b using a set of four receive ports, the UE 115-c may receive signals from the base station 105-b using each receive port of the set of four receive ports. In this example, the UE 115-c may be configured to decode four layers of downlink transmissions (e.g., four layers of PDSCH transmissions) using the four receive ports.

At 420, the UE 115-c may determine to operate in the second power state that is lower than the first power state. In other words, the UE 115-c may determine to operate in the second power state (e.g., reduced power state) that is lower than the first power state. In this regard, the UE 115-c may determine that one or more trigger conditions for transitioning to a reduced power state have been satisfied.

The UE 115-c may determine to operate in the second power state based on any quantity of parameters or characteristics including, but not limited to, a thermal state at the UE 115-c, a power level (e.g., battery level) at the UE 115-c, or both. For example, the UE 115-c may determine to operate in the second power state based on determining that a thermal state at the UE 115-c satisfies a threshold thermal state ($T_{thresh}$). In some cases, the thermal state may satisfy the threshold thermal state if the thermal state is greater than or equal to the threshold thermal state. Moreover, the thermal state may include, but is not limited to, a skin temperature ($T_{skin}$) of the UE 115-c, a junction temperature ($T_j$) of the UE 115-c, or both. In this regard, the UE 115-c may determine to operate in the second power state based on determining that the skin temperature of the UE 115-c is greater than or equal to a threshold skin temperature (e.g., $T_{skin} \geq T_{thresh,skin}$), based on determining that the junction temperature of the UE 115-c is greater than or equal to a threshold junction temperature (e.g., $T_j \geq T_{thresh,j}$), or both.

By way of another example, the UE 115-c may determine to operate in the second power state based on determining that a power level ($P_{UE}$) at the UE 115-c satisfies a threshold power level ($P_{thresh}$). The power level of the UE 115-c may include, but is not limited to, a battery level of the UE 115-c. In some cases, the power level may satisfy the threshold power level if the power level is less than or equal to the threshold power level. In this regard, the UE 115-c may determine to operate in the second power state based on determining that the power level of the UE 115-c is less than or equal to a threshold power level (e.g., $P_{UE} \leq P_{thresh}$).

At 425, the UE 115-c may determine one or more parameters associated with the set of receive ports of the UE 115-c. Parameters associated with the set of receive ports may include, but are not limited to, an RSSI metric, an RSRP metric, an RSRQ metric, a SNR, a SINR, or any combination thereof. In some aspects, the UE 115-c may determine the parameters of the receive ports at 425 based on transmitting the capability report at 405, receiving the first configuration at 410, communicating with the base station 105-b according to the first configuration at 415, or any combination thereof.

For example, in cases where the first configuration indicates that the UE 115-c is to communicate with the base station 105-b using a set of four receive ports, the UE 115-c may receive signals from the base station 105-b using each receive port of the set of four receive ports. In this example, the UE 115-c may perform measurements (e.g., RSSI measurements, RSRP measurements, RSRQ measurements, SNR measurements, SINR measurements) on signals received using each of the respective receive ports. In this regard, the UE 115-c may be configured to determine relative strengths or qualities of signals received using each of the respective receive ports.

At 430, the UE 115-c may be configured to select a subset of receive ports of the set of receive ports of the UE 115-c. More particularly, the UE 115-c may be configured to select a subset of receive ports of the UE 115-c, and may be configured to select a subset of transmit ports corresponding to the selected subset of receive ports of the UE 115-c. In some aspects, the UE 115-c may be configured to select the set of receive ports of the UE 115-c based on the parameters of the receive ports determined at 425.

For example, the UE 115-c may be configured to select a subset of receive ports from the set of receive ports which may be associated with a highest signal strength or quality. For instance, in cases where the first configuration is associated with four receive ports, the UE 115-c may be configured to select a subset of receive ports (e.g., one or two receive ports) which are associated with the highest RSSI metrics, the highest RSRP metrics, the highest RSRQ metrics, the highest SNRs, the highest SINRs, or any combination thereof. Furthermore, the UE 115-c may be configured to select a subset of transmit ports which correspond to the selected subset of receive ports. For instance, in cases where the UE 115-c selects a first receive port and a second receive port out of the set of four receive ports, the UE 115-c may additionally be configured to select a first transmit port corresponding to the first receive port and a second transmit port corresponding to the second receive port.

At 435, the UE 115-c may communicate with the base station 105-b using less than all of the set of transmit ports for SRSs during a second time interval (e.g., second TTI, second slot, second subframe) following the first time interval. In some aspects, the UE 115-c may communicate with the base station 105-b using less than all of the set of transmit ports for SRSs at 425 based on transmitting the capability report at 405, receiving the first configuration at 410, communicating with the base station 105-b according to the first configuration at 415, determining to operate in the second power state at 420, determining the parameters associated with the set of receive ports at 425, selecting the subset of receive and/or transmit ports at 430, or any combination thereof.

For example, the UE 115-c may communicate with the base station 105-b using less than all of the set of transmit ports for SRSs during a second time interval based on determining that a thermal state at the UE 115-c satisfies a threshold thermal state (e.g., based on $T_{skin} \geq T_{thresh,skin}$, $T_j \geq T_{thresh,j}$), based on determining that a power level at the UE 115-c satisfies a threshold power level (e.g., based on $P_{UE} \leq P_{thresh}$), or any combination thereof.

In some aspects, the UE 115-c may communicate with the base station 105-b using less than all of the set of transmit ports at 435 in order to induce the base station 105-b into scheduling transmissions at the UE 115-c which are associated with a lower rank (e.g., reduced quantity of layers). In turn, by inducing the base station 105-b to schedule transmissions which are associated with a lower rank, the UE 115-c may be able to adjust an operational state of one or more receive ports (e.g., deactivate one or more receive ports) of the UE 115-c in order to reduce a power consumption at the UE 115-c, thereby reducing a thermal state at the UE 115-c. Accordingly, in some cases, the UE 115-c may communicate with the base station 105-b using less than all of the set of transmit ports at 435 based on determining to operate in the second power state at 420 in order to reduce power consumption and conserve a power level (e.g., battery level) at the UE 115-c.

For example, at 435, the UE 115-c may be configured to refrain from transmitting SRSs on all transmit ports of a set of transmit ports at the UE 115-c during the second time interval. For instance, in cases where the UE 115-c includes a set of four receive ports, and therefore a set of four transmit ports corresponding to the four receive ports, the UE 115-c may refrain from transmitting SRSs on each transmit port of the set of four transmit ports. In this regard, the UE 115-c may wholly refrain from transmitting any SRSs on the set of transmit ports.

By way of another example, at 435, the UE 115-c may be configured to transmit SRSs on a subset of transmit ports of the set of transmit ports at the UE 115-c during the second time interval. For instance, in cases where the UE 115-c includes a set of four receive ports, and therefore a set of four transmit ports corresponding to the four receive ports, the UE 115-c may transmit SRSs on one, two, or three transmit ports of the set of four transmit ports. In this regard, the UE 115-c may refrain from transmitting SRSs on one or more transmit ports of the set of transmit ports.

In some cases, in addition to performing SRS-AS techniques described in steps 405 to 430 of process flow 400, the UE 115-c may additionally adjust parameters reported to the base station 105-b via CSF reports in order to further induce the base station 105-b to reduce a rank (e.g., quantity of layers) associated with transmissions scheduled at the UE 115-c. In this regard, the UE 115-c may use a combination of SRS-AS techniques and CSF report spoofing techniques in order to reduce a rank of scheduled transmissions, and therefore reduce power consumption and reduce temperatures (e.g., $T_{skin}$, $T_j$)) at the UE 115-c. This may be further understood with reference to steps 440-450 of process flow 400.

At 440, the UE 115-c may determine a rank, a CQI, or both, associated with communications between the UE 115-c and the base station 105-b using one or more receive ports. In some aspects, the UE 115-c may determine the rank and/or CQI associated with communications with the base station 105-b using one or more receive ports based on transmitting the capability report at 405, receiving the first configuration at 410, communicating with the base station 105-b according to the first configuration at 415, determining to operate in the second power state at 420, determining the parameters associated with the set of receive ports at 425, selecting the subset of receive and/or transmit ports at 430, communicating using less than all the transmit ports for SRSs at 435, or any combination thereof.

At 445, the UE 115-c may selectively adjust the rank and/or the CQI determined at 440. In some aspects, the UE 115-c may selectively adjust the determined rank and/or the determined CQI at 445 based on transmitting the capability report at 405, receiving the first configuration at 410, communicating with the base station 105-b according to the first configuration at 415, determining to operate in the second power state at 420, determining the parameters associated with the set of receive ports at 425, selecting the subset of receive and/or transmit ports at 430, communicating using less than all the transmit ports for SRSs at 435, determining the rank and/or CQI at 440, or any combination thereof. The UE 115-c may be configured to selectively adjust the rank and/or CQI in order to further induce the base station 105-b to reduce a rank (e.g., quantity of layers) associated with transmissions scheduled at the UE 115-c, which may result in reduced power consumption and reduced temperatures at the UE 115-c.

At 450, the UE 115-c may transmit a CSF report to the base station 105-b. In some aspects, the CSF report may include an indication of the adjusted rank, the adjusted CQI, or both, which were generated at 445. In this regard, the UE 115-c may transmit the CSF report based on transmitting the capability report at 405, receiving the first configuration at 410, communicating with the base station 105-b according to the first configuration at 415, determining to operate in the second power state at 420, determining the parameters associated with the set of receive ports at 425, selecting the subset of receive and/or transmit ports at 430, communicating using less than all the transmit ports for SRSs at 435, determining the rank and/or CQI at 440, selectively adjusting the determined rank and/or CQI at 445, or any combination thereof.

In some aspects, the UE 115-c may selectively adjust the rank and/or CQI which is reported to the base station 105-b at 450 via the CSF report in order to induce the base station 105-b to reduce a quantity of layers associated with transmissions scheduled at the UE 115-c. For instance, by reporting the adjusted rank (e.g., lowered rank) to the base station 105-b via the CSF report, the base station 105-b may be configured to determine that the UE 115-c is not capable of supporting higher quantities of layers, and may therefore reduce the rank of transmissions scheduled at the UE 115-c base on the adjusted rank. Similarly, by reporting the adjusted CQI (e.g., lowered CQI) to the base station 105-b via the CSF report, the base station 105-b may be configured to determine that the UE 115-c is experiencing poor CQI, and may therefore reduce the rank of transmissions scheduled at the UE 115-c base on the adjusted CQI.

In some aspects, the UE 115-c may use a combination of CSF spoofing techniques and SRS-AS techniques in order to induce the base station 105-b to reduce a rank (e.g., quantity of layers) associated with transmissions scheduled at the UE 115-c. For example, according to some conventional techniques, the UE 115-c may perform CSF spoofing techniques in which the UE 115-c reports selectively adjusted (e.g., selectively reduced) rank and/or CQI to the base station 105-b via a CSF report. However, in some cases, instead of simply reducing the rank of scheduled transmissions based on the adjusted rank and/or CQIs, the base station 105-b may instead instruct the UE 115-c to transmit SRSs so that the base station 105-b may directly determine the rank and/or CQI of wireless communications between the UE 115-c and the base station 105-b. In such cases, if the UE 115-c were not to perform the SRS-AS techniques described herein, the base station 105-b may determine that the adjusted rank and/or CQI values reported to the base station 105-b are inaccurate, and may therefore refrain from reducing the rank of scheduled transmissions. Accordingly, some techniques described herein may use a combination of CSF spoofing techniques and SRS-AS techniques to increase the likelihood that the base station 105-b may be induced into reducing a rank of transmissions scheduled at the UE 115-c.

At 455, the UE 115-c may receive an indication of a second configuration from the base station 105-b. As noted previously herein, the second configuration may indicate one or more parameters associated with wireless communications between the UE 115-c and the base station 105-b including a transmission-reception mode which is to be used at the UE 115-c, a quantity of transmission ports and/or reception ports to be used by the UE 115-c, or both. For example, the second configuration may indicate for the UE 115-c to communicate with the base station 105-b using a first subset of receive ports of the set of receive ports at the UE 115-c. The second configuration may be indicated to the UE 115-c via a control message (e.g., RRC message, DCI message, MAC-CE message).

In some aspects, the UE 115-c may receive the second configuration at 455 based on communicating with the base station 105-b using less than all the transmit ports for SRSs at 435, receiving the CSF report at 450, or both. For example, the UE 115-c may receive the second configuration at 455 based on refraining from transmitting SRSs on all the transmit ports of the UE 115-c at 435. By way of another example, the UE 115-c may receive the second configuration at 455 based on transmitting SRSs on a subset of transmit ports corresponding to a subset of receive ports of the UE 115-c at 435. Furthermore, in some cases, the UE 115-c may receive the second configuration at 455 based on communicating with the base station 105-b using less than all the transmit ports for SRSs at 435 in conjunction with reporting the selectively adjusted (e.g., selectively reduced) rank and/or CQI to the base station 105-b via the CSF report at 450.

In some aspects, the second configuration may indicate for the UE 115-c to communicate with the base station 105-b using a first subset of receive ports of the set of receive ports at the UE 115-c. In this regard, the second configuration may reduce a quantity of receive ports used at the UE 115-c relative to the first configuration. For example, the first configuration may indicate for the UE 115-c to use a set of four receive ports at the UE 115-c. Subsequently, at 435, the UE 115-c may transmit SRSs using a first transmit port and a second transmit port corresponding to a first receive port and a second receive port, respectively. In this example, the second configuration may indicate for the UE 115-c to use the first receive port and the second receive port corresponding to the first transmit port and the second transmit port. In this regard, the second configuration may reduce a quantity of receive ports used by the UE 115-c from four receive ports to two receive ports.

At 460, the UE 115-c may selectively adjust one or more parameters associated with a second subset of receive ports of the UE 115-c. In some aspects, the UE 115-c may selectively adjust the one or more parameters associated with the second subset of receive ports in order to operate in the second power state (e.g., reduced power state) determined at 430. Parameters associated with the second subset of receive ports which may be adjusted may include parameters associated with LNAs, phase shifters, or both. In some cases, the UE 115-c may selectively adjust one or more parameters associated with the second subset of receive ports in order to adjust an operational state (e.g., deactivate) the second subset of receive ports, which may thereby reduce power consumption and/or temperate at the UE 115-c. In some aspects, the UE 115-c may selectively adjust the parameters associated with the second subset of receive ports based on receiving the second configuration at 455.

For example, as noted previously herein, the first configuration may indicate for the UE 115-c to use a set of four receive ports at the UE 115-c (e.g., first receive port, second receive port, third receive port, fourth receive port). Subsequently, at 435, the UE 115-c may transmit SRSs using a second transmit port and a fourth transmit port corresponding to the second receive port and the fourth receive port, respectively. In this example, the second configuration may indicate for the UE 115-c to use the second receive port and the fourth receive port based on the SRSs received at 435. Thus, first subset of receive ports indicated by the second configuration may include the second and fourth receive ports. In this example, the UE 115-c may selectively adjust parameters associated with the first and third receive ports (e.g., a second subset of receive ports) in order to reduce a power consumption of the first and third receive ports. For instance, the UE 115-c may deactivate the first and third receive ports by selectively adjusting parameters associated with LNAs, phase shifters, and/or other components of the first and third receive ports.

By inducing the base station 105-b to transmit the second configuration which instructs the UE 115-c to communicate using a subset of receive ports, the techniques described herein may be used by the UE 115-c to effectively reduce a rank of transmissions scheduled at the UE 115-c. Therefore, by effectively reducing a rank of scheduled transmissions, techniques described herein may enable the UE 115-c to deactivate a subset of receive ports, which may enable the UE 115-c to enter a lower operational power state, reduce power consumption at the UE 115-c, and reduce a temperature (e.g., reduce $T_{skin}$ and/or $T_j$) at the UE 115-c. Such power savings techniques may enable the UE 115-c to reduce power consumption at both a modem baseband of the UE 115-c and a radio frequency transceiver of the UE 115-c.

At 465, the UE 115-c may communicate with the base station 105-b according to the second configuration. In this regard, the UE 115-c may communicate with the base station 105-b by receiving signals using the first subset of receive ports indicated in the second configuration. Moreover, the UE 115-c may communicate with the base station 105-b by transmitting SRSs using a subset of transmit ports corresponding to the first subset of receive ports indicated in the second configuration. Accordingly, the UE 115-c may communicate with the base station 105-b at 465 using a lower quantity of layers (e.g., reduced rank) as compared to communications which were carried out according to the first configuration.

The UE 115-c may communicate base station 105-b according to the second configuration at 465 based on receiving the second configuration at 450, selectively adjusting the parameters associated with the second subset of receive ports at 460, or both. For example, the second configuration may indicate for the UE 115-c to use a first subset of receive ports including a first receive port and a third receive port. Subsequently, the UE 115-c may deactivate a second receive port and a fourth receive port in order to enter the second power state (e.g., reduced power state). In this example, the UE 115-c may communicate with the base station 105-b according to the second configuration by receiving downlink transmissions from the base station 105-b using the first and third receive ports. In this example, the UE 115-c may be configured to decode two layers of downlink transmissions (e.g., two layers of PDSCH transmissions) using the first and third receive ports.

In some aspects, the UE 115-c may subsequently induce the base station 105-b to increase a quantity of layers associated with transmissions scheduled at the UE 115-c. For example, following the communications at 465, the UE 115-c may subsequently determine that it may return to the first power state (e.g., the default power state, or other power state) which is higher than the second power state. The UE 115-c may determine to return the first power state based on determining that the thermal state of the UE 115-c no longer satisfies the threshold thermal state (e.g., based on determining $T_{skin} < T_{thresh,skin}$, and/or $T_j < T_{thresh,j}$), based on determining that the power level (e.g., battery level) of the UE 115-c no longer satisfies the threshold power level (e.g., based on determining $P_{UE} > P_{thresh}$), or both.

Continuing with the same example, upon determining that the UE 115-c is to operate in the first power state, the UE 115-c may transmit SRSs using an increased quantity of transmit ports corresponding to an increased quantity of receive ports. For example, in cases where the second configuration includes two receive ports (e.g., 2Rx), the UE 115-c may transmit SRSs using four transmit ports corresponding to the four receive ports in order to induce the base station 105-b to increase the quantity of layers associated with transmissions scheduled at the UE 115-c. Additionally or alternatively, the UE 115-c may transmit a CSF report which indicates a higher rank and/or higher CQI as compared to the rank, CQI, or both, indicated in the CSF report at 450 in order to further induce the base station 105-b to increase the quantity of layers associated with transmissions scheduled at the UE 115-c.

The UE 115-c may implement the power-savings techniques described herein for a limited duration of time until such power-savings techniques are no longer necessary. In other words, the UE 115-c may implement the techniques described herein to reduce the power level at the UE 115-c, correspondingly reducing a power consumption and/or temperature of the UE 115-c. Subsequently, when the temperature (e.g., $T_{skin}$, $T_j$) of the UE 115-c falls below the threshold temperature (e.g., $T_{thresh,skin}$, $T_{thresh,j}$) and/or when the power level (e.g., $P_{UE}$, battery level) of the UE 115-c rises above the threshold power level (e.g., $P_{thresh}$), the UE 115-c may transmit SRSs and/or transmit a CSF report in order to return to the first power state and/or the first configuration.

The techniques described herein may enable the UE 115-c to reduce a power state at the UE 115-c, correspondingly reducing a power consumption at the UE 115-c and reducing a temperature at the UE 115-c. In particular, techniques described herein may enable the UE 115-c to perform SRS-AS in which the UE 115-c refrains from transmitting SRSs and/or transmits SRSs using a subset of transmit ports in order to induce the base station 105-b to reduce a rank of scheduled transmissions. In this regard, by inducing the base station 105-b to reduce a rank of scheduled transmissions, the UE 115-c may be able to deactivate one or more receive ports at the UE 115-c, thereby enabling the UE 115-c to enter a lower power state, reduce power consumption, and reduce a temperature at the UE 115-c. Such thermal mitigation and power savings techniques may enable the UE 115-c to reduce power consumption at both modem baseband and radio frequency transceiver components of the UE 115-c.

Figure 5:
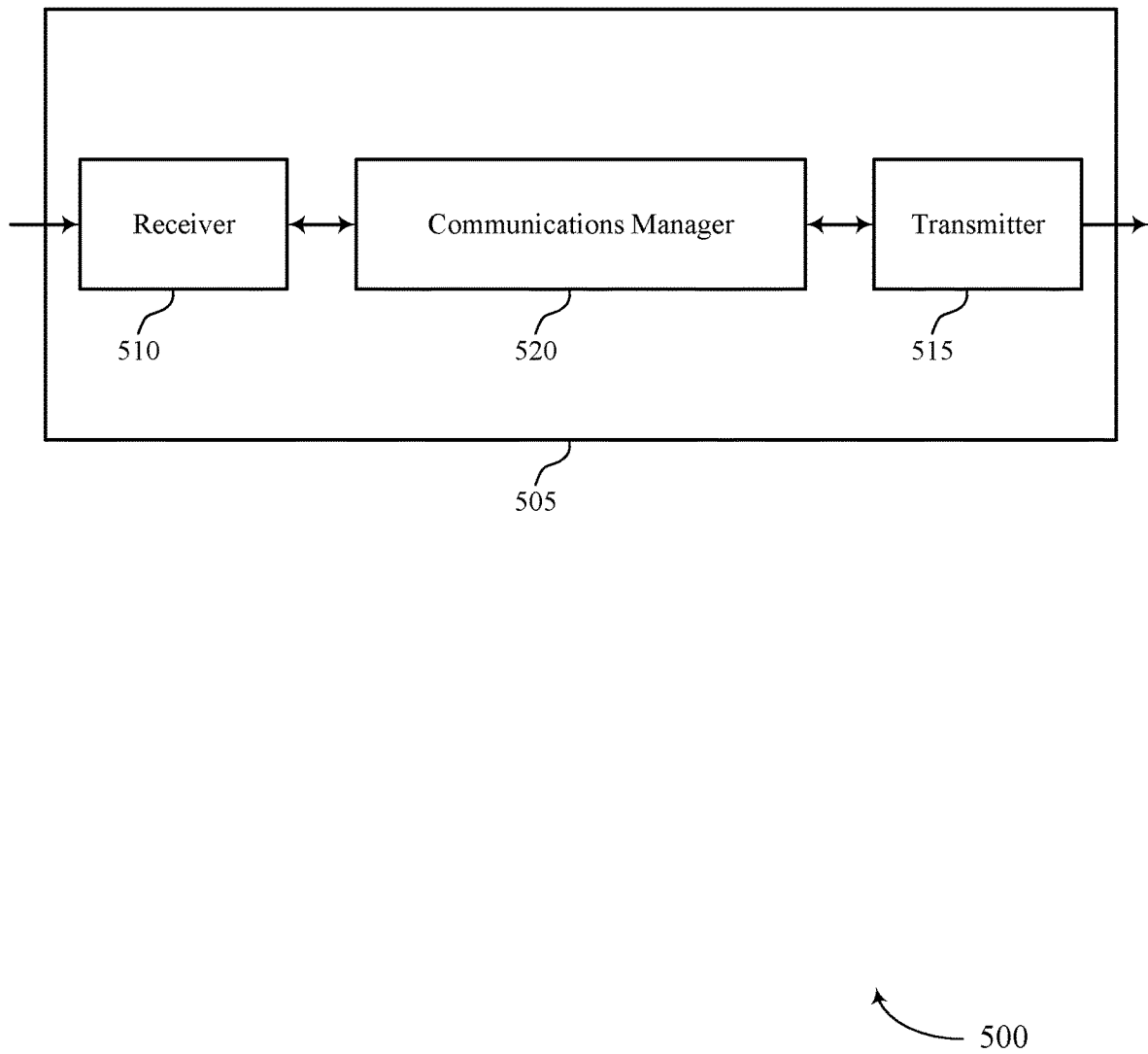
FIGS. 5 and 6 show block diagrams of devices that support techniques for thermal mitigation and power saving in accordance with aspects of the present disclosure.

FIG. 5 shows a block diagram 500 of a device 505 that supports techniques for thermal mitigation and power saving in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for thermal mitigation and power saving). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for thermal mitigation and power saving). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for thermal mitigation and power saving as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a first configuration indicating that the UE is to communicate with the base station using a set of multiple receive ports of the UE. The communications manager 520 may be configured as or otherwise support a means for transmitting, according to the first configuration in a first time interval associated with a first power state of the UE, SRSs on a set of multiple transmit ports corresponding to the set of multiple receive ports. The communications manager 520 may be configured as or otherwise support a means for communicating with the base station during a second time interval following the first time interval using less than all of the set of multiple transmit ports for the SRSs based on the UE determining to operate in a second power state lower than the first power state. The communications manager 520 may be configured as or otherwise support a means for receiving, from the base station based on communicating with the base station using less than all of the set of multiple transmit ports for the SRSs, a second configuration indicating for the UE to communicate with the base station using a first subset of receive ports of the set of multiple receive ports.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing a thermal state (e.g., temperature) and/or power consumption the UE 115. In particular, techniques described herein may enable the UE 115 to perform SRS-AS in which the UE 115 refrains from transmitting SRSs and/or transmits SRSs using a subset of transmit ports in order to induce the base station 105 to reduce a rank of scheduled transmissions. In this regard, by inducing the base station 105 to reduce a rank of scheduled transmissions, the UE 115 may be able to deactivate one or more receive ports at the UE 115-c, thereby enabling the UE 115-c to enter a lower power state, reduce power consumption, and reduce a temperature at the UE 115-c. By reducing a thermal state of the UE 115, the efficiency and reliability of wireless communications at the UE 115 may be improved.

Figure 6:
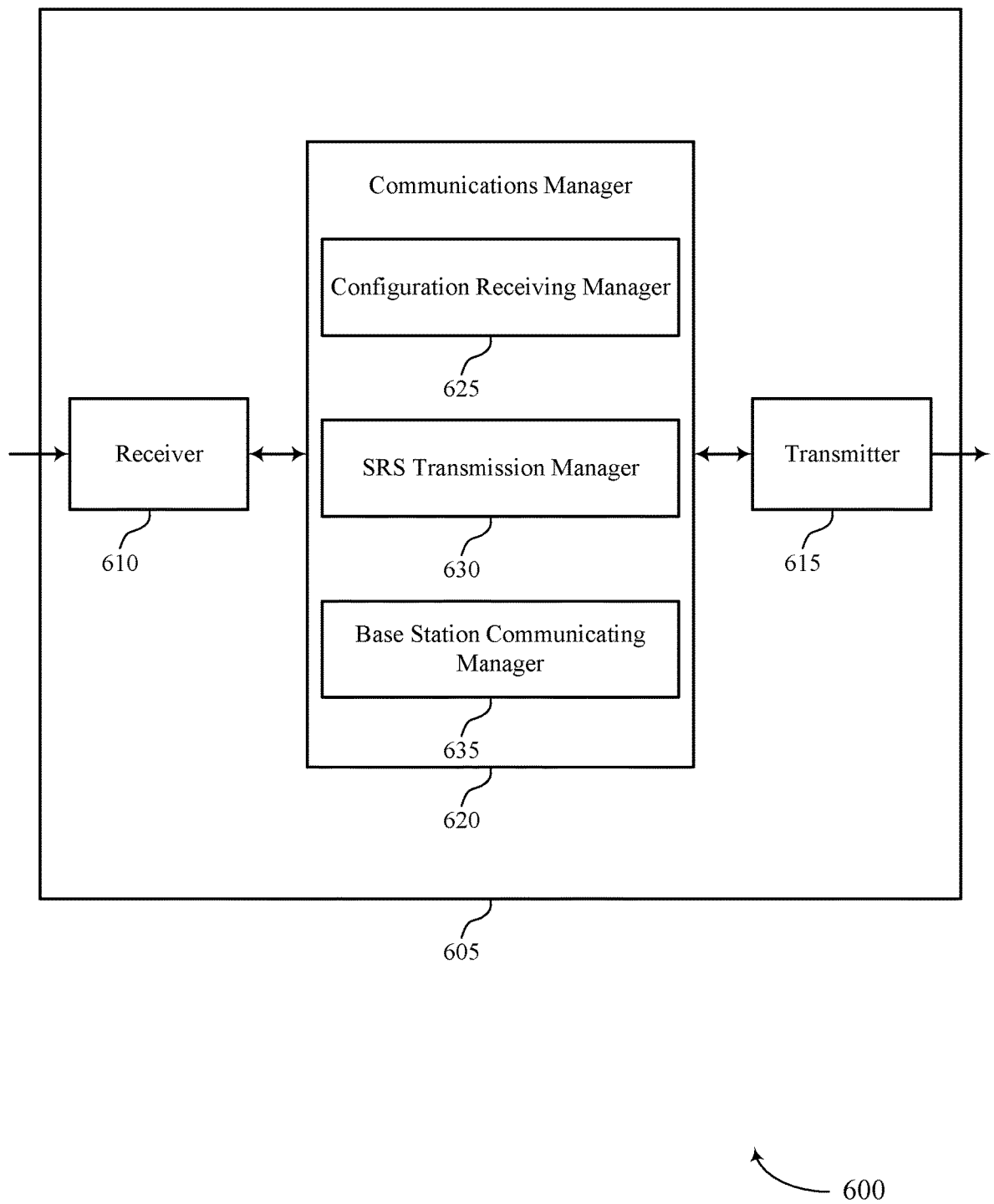

FIG. 6 shows a block diagram 600 of a device 605 that supports techniques for thermal mitigation and power saving in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for thermal mitigation and power saving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for thermal mitigation and power saving). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for thermal mitigation and power saving as described herein. For example, the communications manager 620 may include a configuration receiving manager 625, an SRS transmission manager 630, a base station communicating manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration receiving manager 625 may be configured as or otherwise support a means for receiving, from a base station, a first configuration indicating that the UE is to communicate with the base station using a set of multiple receive ports of the UE. The SRS transmission manager 630 may be configured as or otherwise support a means for transmitting, according to the first configuration in a first time interval associated with a first power state of the UE, SRSs on a set of multiple transmit ports corresponding to the set of multiple receive ports. The base station communicating manager 635 may be configured as or otherwise support a means for communicating with the base station during a second time interval following the first time interval using less than all of the set of multiple transmit ports for the SRSs based on the UE determining to operate in a second power state lower than the first power state. The configuration receiving manager 625 may be configured as or otherwise support a means for receiving, from the base station based on communicating with the base station using less than all of the set of multiple transmit ports for the SRSs, a second configuration indicating for the UE to communicate with the base station using a first subset of receive ports of the set of multiple receive ports.

Figure 7:
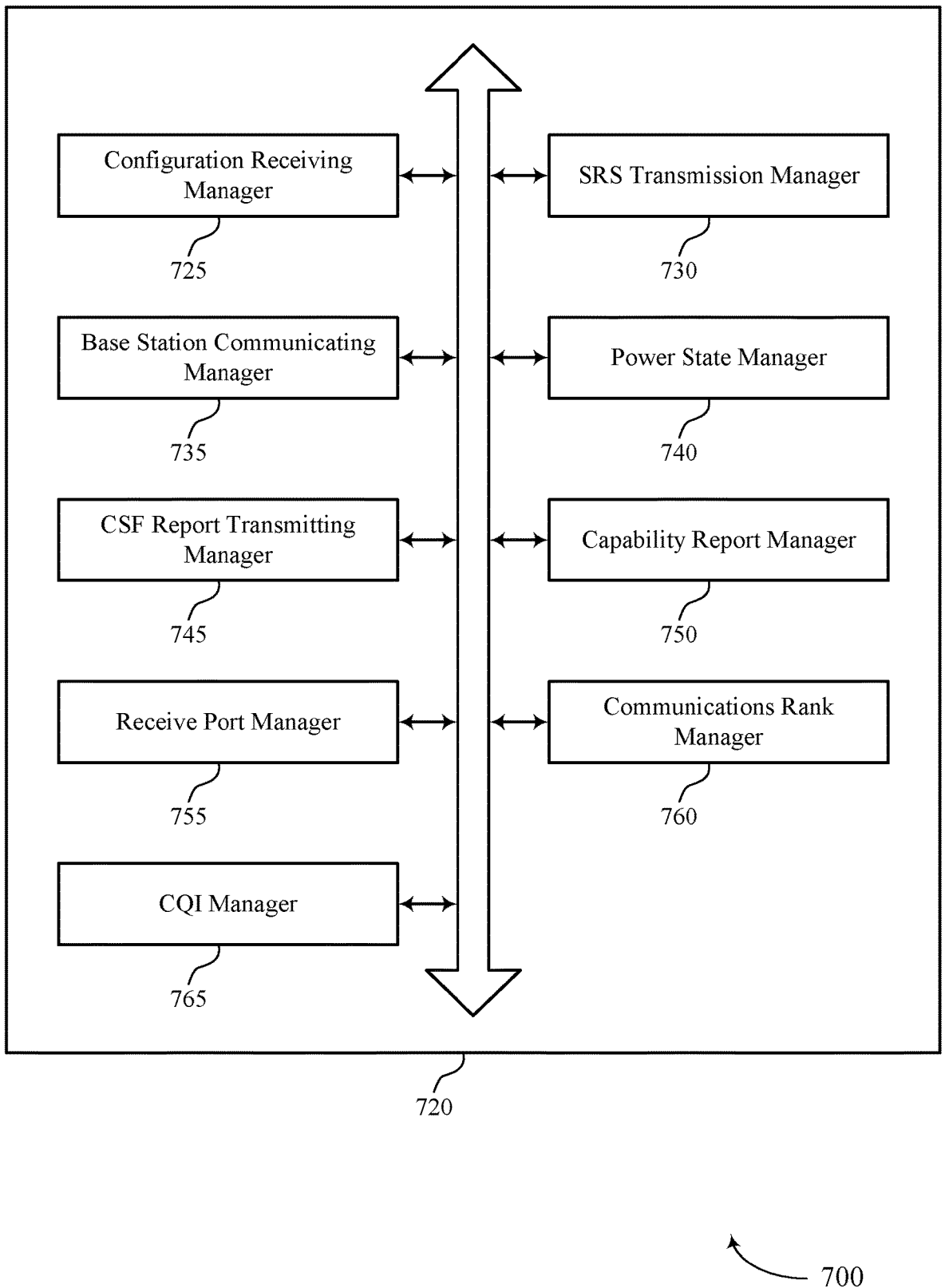
FIG. 7 shows a block diagram of a communications manager that supports techniques for thermal mitigation and power saving in accordance with aspects of the present disclosure.

FIG. 7 shows a block diagram 700 of a communications manager 720 that supports techniques for thermal mitigation and power saving in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for thermal mitigation and power saving as described herein. For example, the communications manager 720 may include a configuration receiving manager 725, an SRS transmission manager 730, a base station communicating manager 735, a power state manager 740, an CSF report transmitting manager 745, a capability report manager 750, a receive port manager 755, a communications rank manager 760, a CQI manager 765, or any combination thereof. Each of these components may communicate, directly or indirectly, with one another (e.g., via one or more buses).

The communications manager 720 may support wireless communication at a UE in accordance with examples as disclosed herein. The configuration receiving manager 725 may be configured as or otherwise support a means for receiving, from a base station, a first configuration indicating that the UE is to communicate with the base station using a set of multiple receive ports of the UE. The SRS transmission manager 730 may be configured as or otherwise support a means for transmitting, according to the first configuration in a first time interval associated with a first power state of the UE, SRSs on a set of multiple transmit ports corresponding to the set of multiple receive ports. The base station communicating manager 735 may be configured as or otherwise support a means for communicating with the base station during a second time interval following the first time interval using less than all of the set of multiple transmit ports for the SRSs based on the UE determining to operate in a second power state lower than the first power state. In some examples, the configuration receiving manager 725 may be configured as or otherwise support a means for receiving, from the base station based on communicating with the base station using less than all of the set of multiple transmit ports for the SRSs, a second configuration indicating for the UE to communicate with the base station using a first subset of receive ports of the set of multiple receive ports.

In some examples, to support communicating with the base station using less than all of the set of multiple transmit ports for the SRSs, the SRS transmission manager 730 may be configured as or otherwise support a means for refraining from transmitting SRSs on all transmit ports of the set of multiple transmit ports, where receiving the second configuration is based on the UE refraining from transmitting SRSs on all of the transmit ports.

In some examples, to support communicating with the base station using less than all of the set of multiple transmit ports for the SRSs, the SRS transmission manager 730 may be configured as or otherwise support a means for transmitting, during the second time interval, SRSs on a subset of transmit ports of the set of multiple transmit ports, where receiving the second configuration is based on transmitting the SRSs on the subset of transmit ports.

In some examples, the receive port manager 755 may be configured as or otherwise support a means for determining one or more parameters associated with the set of multiple receive ports. In some examples, the receive port manager 755 may be configured as or otherwise support a means for selecting the subset of transmit ports of the set of multiple transmit ports corresponding to a subset of receive ports of the set of multiple receive ports based on the one or more parameters, where transmitting the SRSs on the subset of transmit ports is based on the selecting. In some examples, the one or more parameters associated with the set of multiple receive ports include a RSSI metric, a RSRP metric, a RSRQ metric, a SNR ratio, a SINR ratio, or any combination thereof.

In some examples, the set of multiple transmit ports includes four transmit ports. In some examples, the subset of transmit ports includes one or two transmit ports.

In some examples, the power state manager 740 may be configured as or otherwise support a means for determining to operate in the second power state based on determining that a thermal state at the UE is greater than or equal to a threshold thermal state, where communicating with the base station using less than all of the set of multiple transmit ports for the SRSs is based on determining that the thermal state at the UE is greater than or equal to the threshold thermal state. In some examples, the thermal state includes a skin temperate of the UE, a junction temperature of the UE, or both.

In some examples, the power state manager 740 may be configured as or otherwise support a means for determining to operate in the second power state based on determining that a power level at the UE satisfies a threshold power level, where communicating with the base station using less than all of the set of multiple transmit ports for the SRSs is based on determining that the power level at the UE satisfies the threshold power level. In some examples, the power level satisfies the threshold power level when the power level is less than or equal to the threshold power level. In some examples, the power level includes a battery level of the UE.

In some examples, the CSF report transmitting manager 745 may be configured as or otherwise support a means for transmitting, to the base station, a CSF report based on the UE determining to operate in the second power state, where receiving the second configuration is based on transmitting the CSF report and communicating with the base station using less than all of the set of multiple transmit ports for the SRSs.

In some examples, the communications rank manager 760 may be configured as or otherwise support a means for determining a rank associated with communications with the base station using one or more receive ports of the set of multiple receive ports. In some examples, the communications rank manager 760 may be configured as or otherwise support a means for selectively adjusting the determined rank to generate an adjusted rank less than the determined rank based on the UE determining to operate in the second power state, where the CSF report includes an indication of the adjusted rank.

In some examples, the CQI manager 765 may be configured as or otherwise support a means for determining a CQI associated with communications with the base station using one or more receive ports of the set of multiple receive ports. In some examples, the CQI manager 765 may be configured as or otherwise support a means for selectively adjusting the determined CQI to generate an adjusted CQI less than the determined CQI based on the UE determining to operate in the second power state, where the CSF report includes an indication of the adjusted CQI.

In some examples, the capability report manager 750 may be configured as or otherwise support a means for transmitting, to the base station, a capability report including an indication of one or more transmission-reception modes supported by the UE, where receiving the first configuration is based on transmitting the capability report. In some examples, the one or more transmission-reception modes include a transmission-reception mode indicating one transmission port and four reception ports for the UE, a transmission-reception mode indicating two transmission ports and four reception ports for the UE, or both.

In some examples, the receive port manager 755 may be configured as or otherwise support a means for selectively adjusting one or more parameters associated with a second subset of receive ports of the set of multiple receive ports based on receiving the second configuration. In some examples, the one or more parameters are associated with a LNA for the second subset of receive ports, a phase shifter for the second subset of receive ports, or both.

Figure 8:
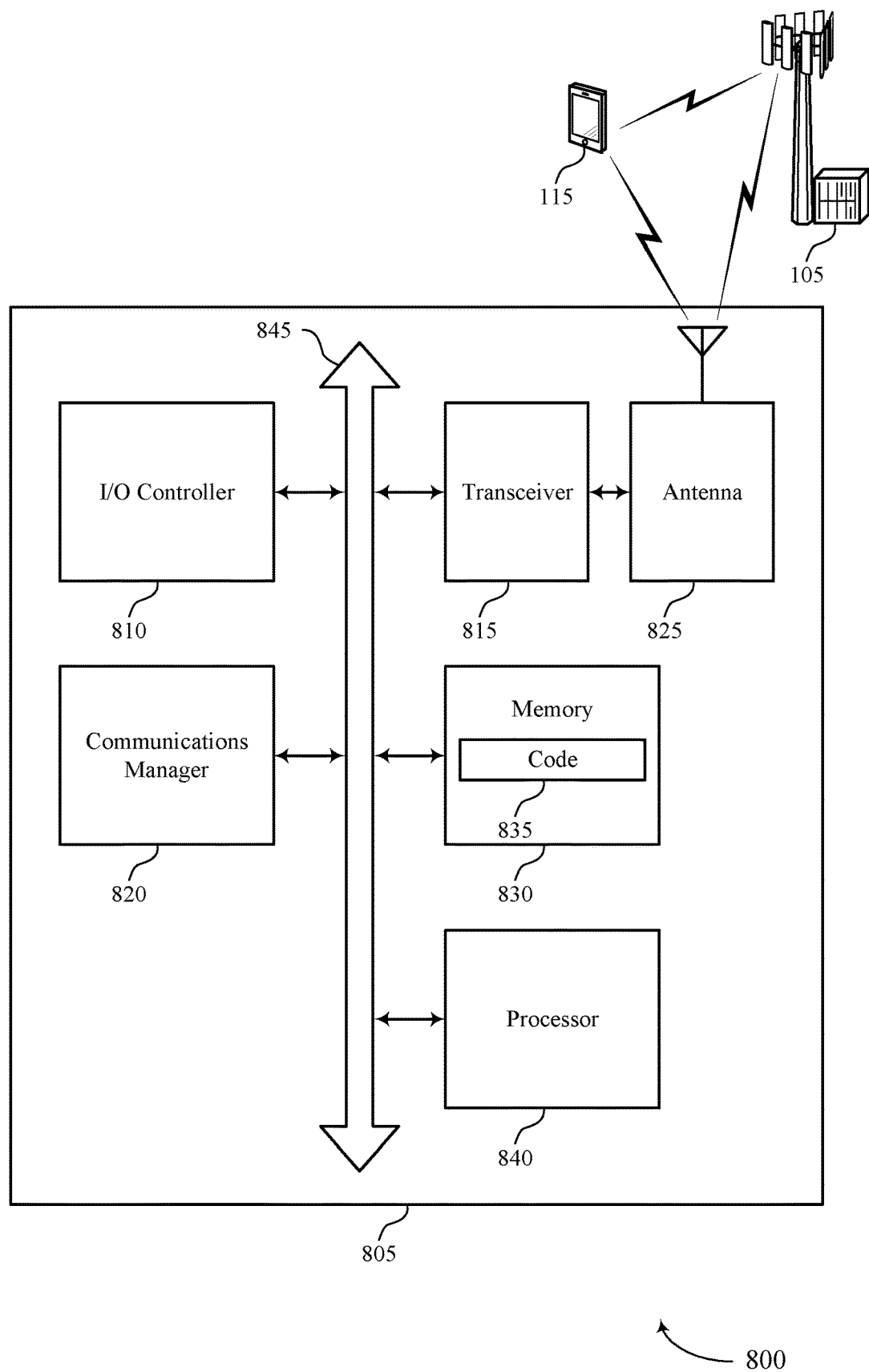
FIG. 8 shows a diagram of a system including a device that supports techniques for thermal mitigation and power saving in accordance with aspects of the present disclosure.

FIG. 8 shows a diagram of a system 800 including a device 805 that supports techniques for thermal mitigation and power saving in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for thermal mitigation and power saving). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a first configuration indicating that the UE is to communicate with the base station using a set of multiple receive ports of the UE. The communications manager 820 may be configured as or otherwise support a means for transmitting, according to the first configuration in a first time interval associated with a first power state of the UE, SRSs on a set of multiple transmit ports corresponding to the set of multiple receive ports. The communications manager 820 may be configured as or otherwise support a means for communicating with the base station during a second time interval following the first time interval using less than all of the set of multiple transmit ports for the SRSs based on the UE determining to operate in a second power state lower than the first power state. The communications manager 820 may be configured as or otherwise support a means for receiving, from the base station based on communicating with the base station using less than all of the set of multiple transmit ports for the SRSs, a second configuration indicating for the UE to communicate with the base station using a first subset of receive ports of the set of multiple receive ports.

By including or configuring the communications manager 820 in accordance with examples as described herein, the device 805 may support techniques for reducing a thermal state (e.g., temperature) and/or power consumption the UE 115. In particular, techniques described herein may enable the UE 115 to perform SRS-AS in which the UE 115 refrains from transmitting SRSs and/or transmits SRSs using a subset of transmit ports in order to induce the base station 105 to reduce a rank of scheduled transmissions. In this regard, by inducing the base station 105 to reduce a rank of scheduled transmissions, the UE 115 may be able to deactivate one or more receive ports at the UE 115-c, thereby enabling the UE 115-c to enter a lower power state, reduce power consumption, and reduce a temperature at the UE 115-c. By reducing a thermal state of the UE 115, the efficiency and reliability of wireless communications at the UE 115 may be improved, and a batter life of the UE 115 may be improved.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for thermal mitigation and power saving as described herein, or the processor 840 and the memory 830 may be otherwise configured to perform or support such operations.

Figure 9:
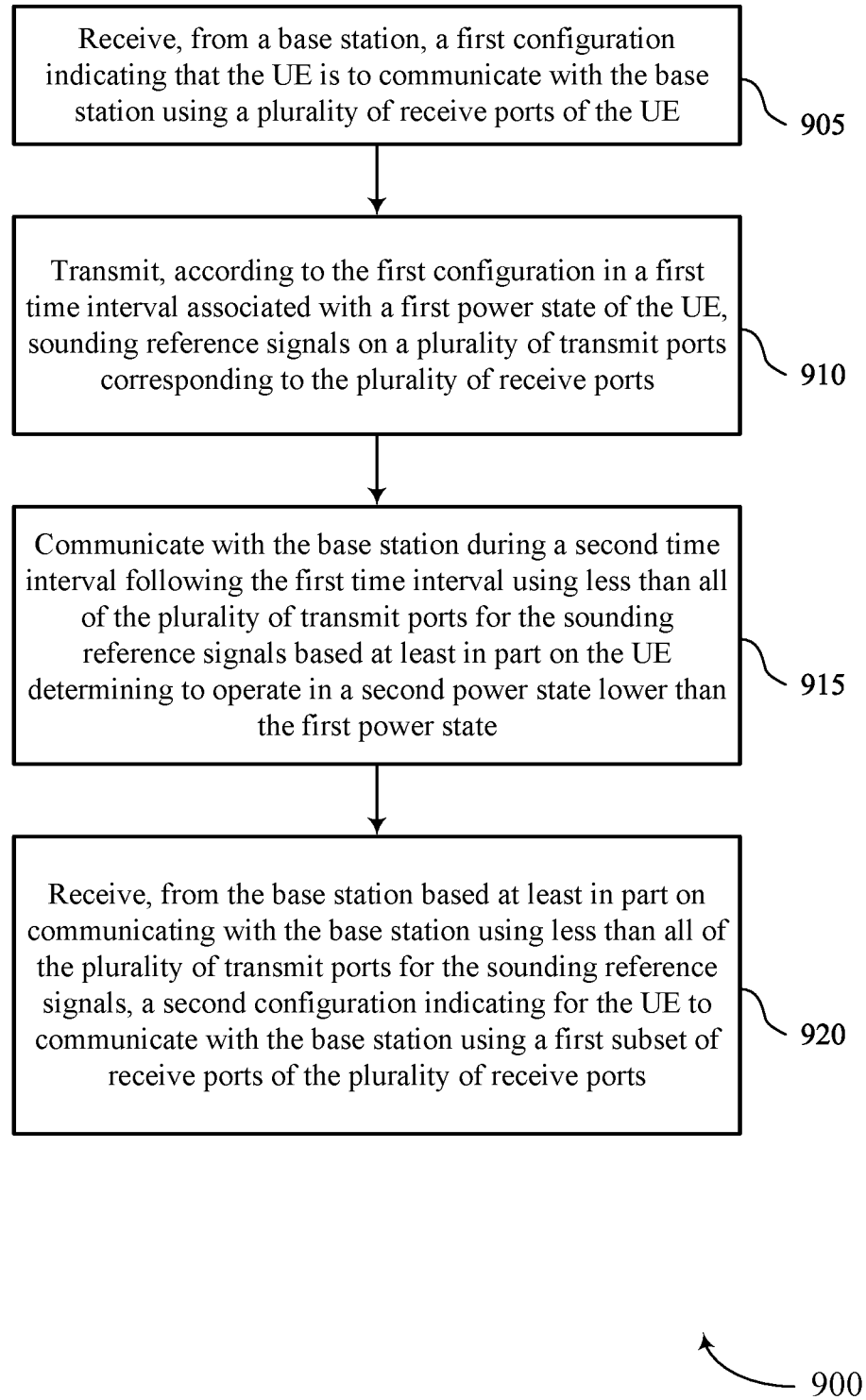
FIGS. 9 through 13 show flowcharts illustrating methods that support techniques for thermal mitigation and power saving in accordance with aspects of the present disclosure.

FIG. 9 shows a flowchart illustrating a method 900 that supports techniques for thermal mitigation and power saving in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, a first configuration indicating that the UE is to communicate with the base station using a set of multiple receive ports of the UE. The operations of 905 may be performed in accordance with examples as disclosed herein. In some examples, aspects of the operations of 905 may be performed by a configuration receiving manager 725 as described with reference to FIG. 7.

At 910, the method may include transmitting, according to the first configuration in a first time interval associated with a first power state of the UE, SRSs on a set of multiple transmit ports corresponding to the set of multiple receive ports. The operations of 910 may be performed in accordance with examples as disclosed herein. In some examples, aspects of the operations of 910 may be performed by an SRS transmission manager 730 as described with reference to FIG. 7.

At 915, the method may include communicating with the base station during a second time interval following the first time interval using less than all of the set of multiple transmit ports for the SRSs based on the UE determining to operate in a second power state lower than the first power state. The operations of 915 may be performed in accordance with examples as disclosed herein. In some examples, aspects of the operations of 915 may be performed by a base station communicating manager 735 as described with reference to FIG. 7.

At 920, the method may include receiving, from the base station based on communicating with the base station using less than all of the set of multiple transmit ports for the SRSs, a second configuration indicating for the UE to communicate with the base station using a first subset of receive ports of the set of multiple receive ports. The operations of 920 may be performed in accordance with examples as disclosed herein. In some examples, aspects of the operations of 920 may be performed by a configuration receiving manager 725 as described with reference to FIG. 7.

Figure 10:
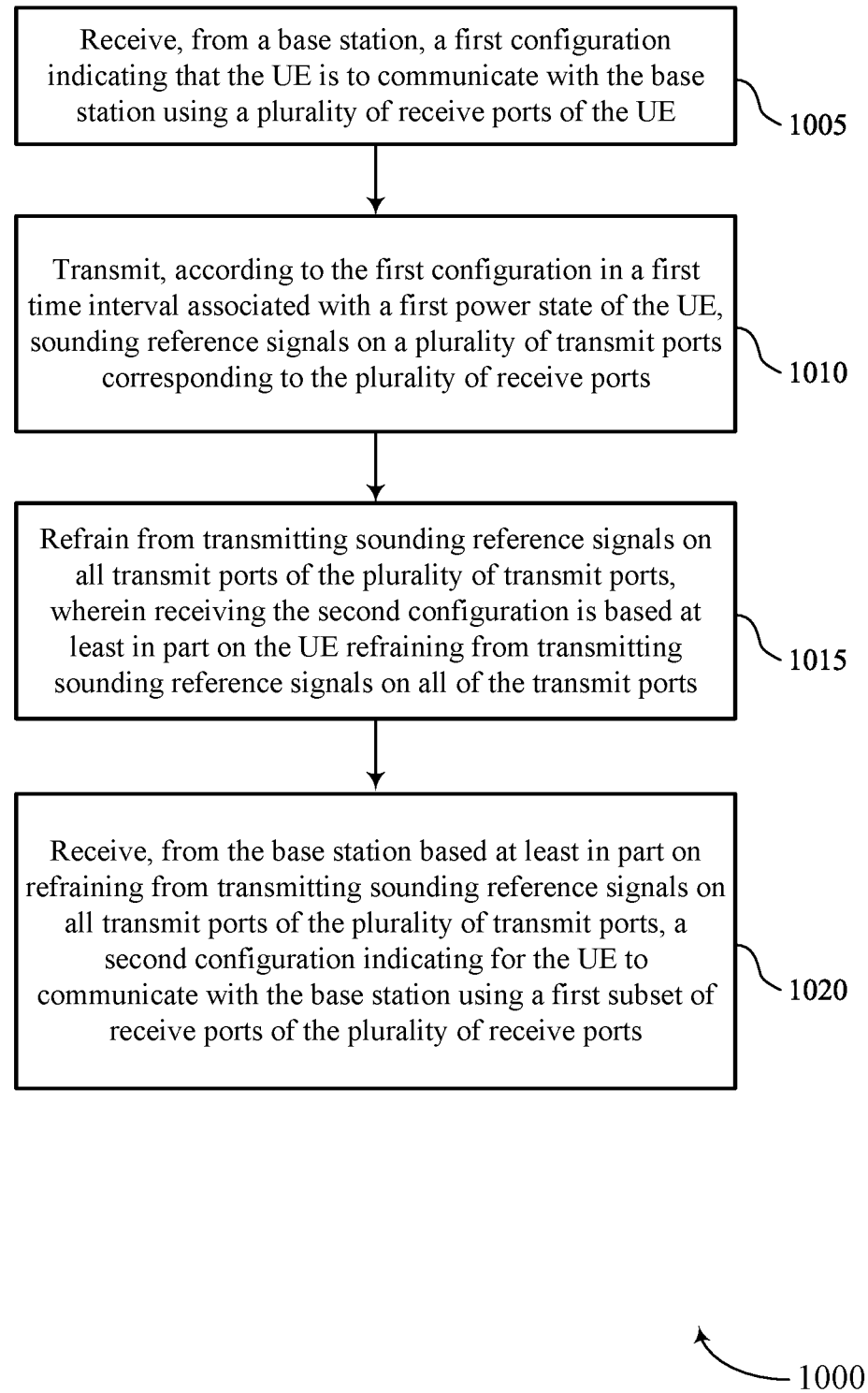

FIG. 10 shows a flowchart illustrating a method 1000 that supports techniques for thermal mitigation and power saving in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, a first configuration indicating that the UE is to communicate with the base station using a set of multiple receive ports of the UE. The operations of 1005 may be performed in accordance with examples as disclosed herein. In some examples, aspects of the operations of 1005 may be performed by a configuration receiving manager 725 as described with reference to FIG. 7.

At 1010, the method may include transmitting, according to the first configuration in a first time interval associated with a first power state of the UE, SRSs on a set of multiple transmit ports corresponding to the set of multiple receive ports. The operations of 1010 may be performed in accordance with examples as disclosed herein. In some examples, aspects of the operations of 1010 may be performed by an SRS transmission manager 730 as described with reference to FIG. 7.

At 1015, the method may include refraining from transmitting SRSs on all transmit ports of the set of multiple transmit ports. The operations of 1015 may be performed in accordance with examples as disclosed herein. In some examples, aspects of the operations of 1015 may be performed by an SRS transmission manager 730 as described with reference to FIG. 7.

At 1020, the method may include receiving, from the base station based on refraining from transmitting SRSs on all of the transmit ports of the set of multiple transmit ports, a second configuration indicating for the UE to communicate with the base station using a first subset of receive ports of the set of multiple receive ports. The operations of 1020 may be performed in accordance with examples as disclosed herein. In some examples, aspects of the operations of 1020 may be performed by a configuration receiving manager 725 as described with reference to FIG. 7.

Figure 11:
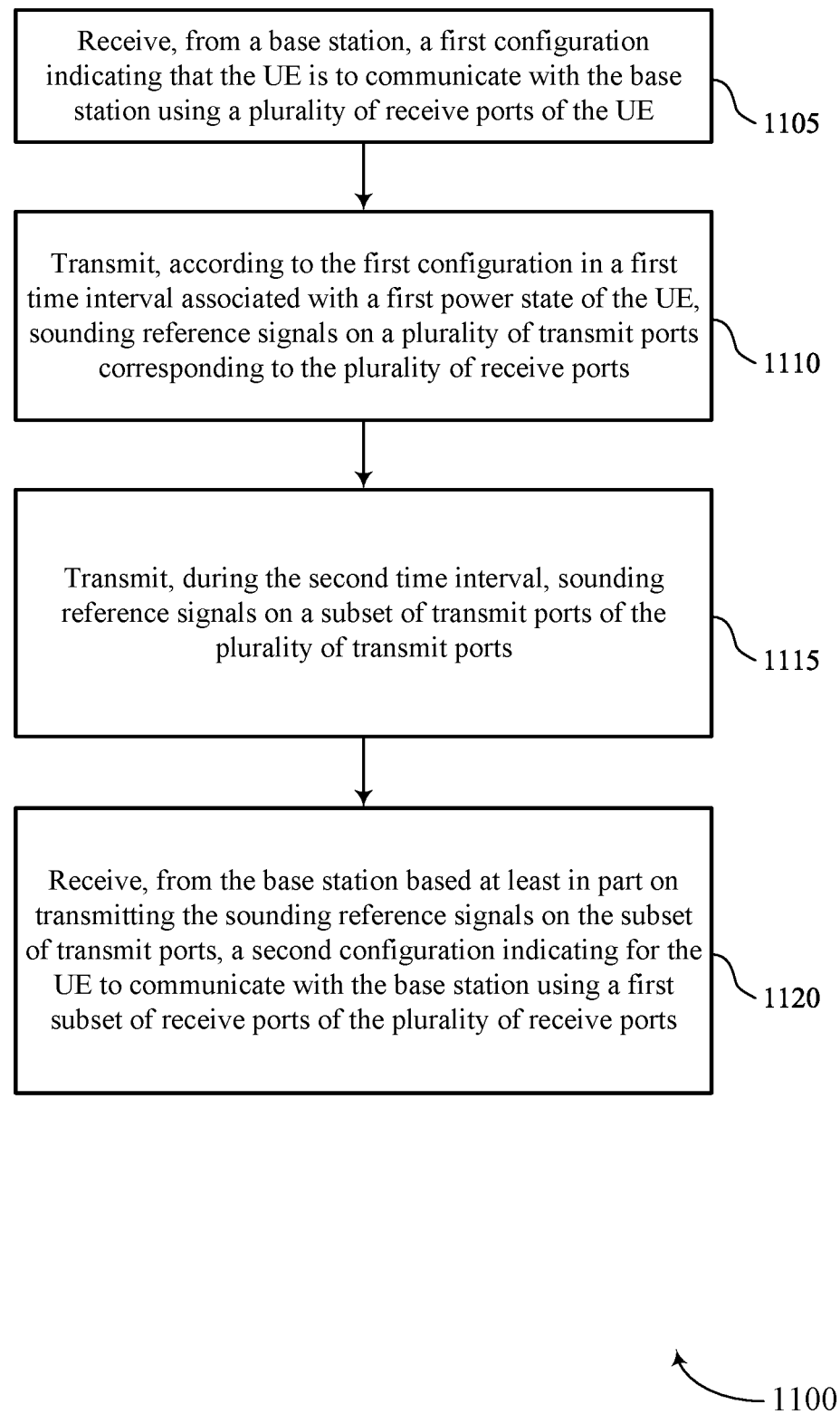

FIG. 11 shows a flowchart illustrating a method 1100 that supports techniques for thermal mitigation and power saving in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, a first configuration indicating that the UE is to communicate with the base station using a set of multiple receive ports of the UE. The operations of 1105 may be performed in accordance with examples as disclosed herein. In some examples, aspects of the operations of 1105 may be performed by a configuration receiving manager 725 as described with reference to FIG. 7.

At 1110, the method may include transmitting, according to the first configuration in a first time interval associated with a first power state of the UE, SRSs on a set of multiple transmit ports corresponding to the set of multiple receive ports. The operations of 1110 may be performed in accordance with examples as disclosed herein. In some examples, aspects of the operations of 1110 may be performed by an SRS transmission manager 730 as described with reference to FIG. 7.

At 1115, the method may include transmitting, during the second time interval, SRSs on a subset of transmit ports of the set of multiple transmit ports. The operations of 1115 may be performed in accordance with examples as disclosed herein. In some examples, aspects of the operations of 1115 may be performed by an SRS transmission manager 730 as described with reference to FIG. 7.

At 1120, the method may include receiving, from the base station based on transmitting the SRSs on the subset of transmit ports, a second configuration indicating for the UE to communicate with the base station using a first subset of receive ports of the set of multiple receive ports. The operations of 1120 may be performed in accordance with examples as disclosed herein. In some examples, aspects of the operations of 1120 may be performed by a configuration receiving manager 725 as described with reference to FIG. 7.

Figure 12:
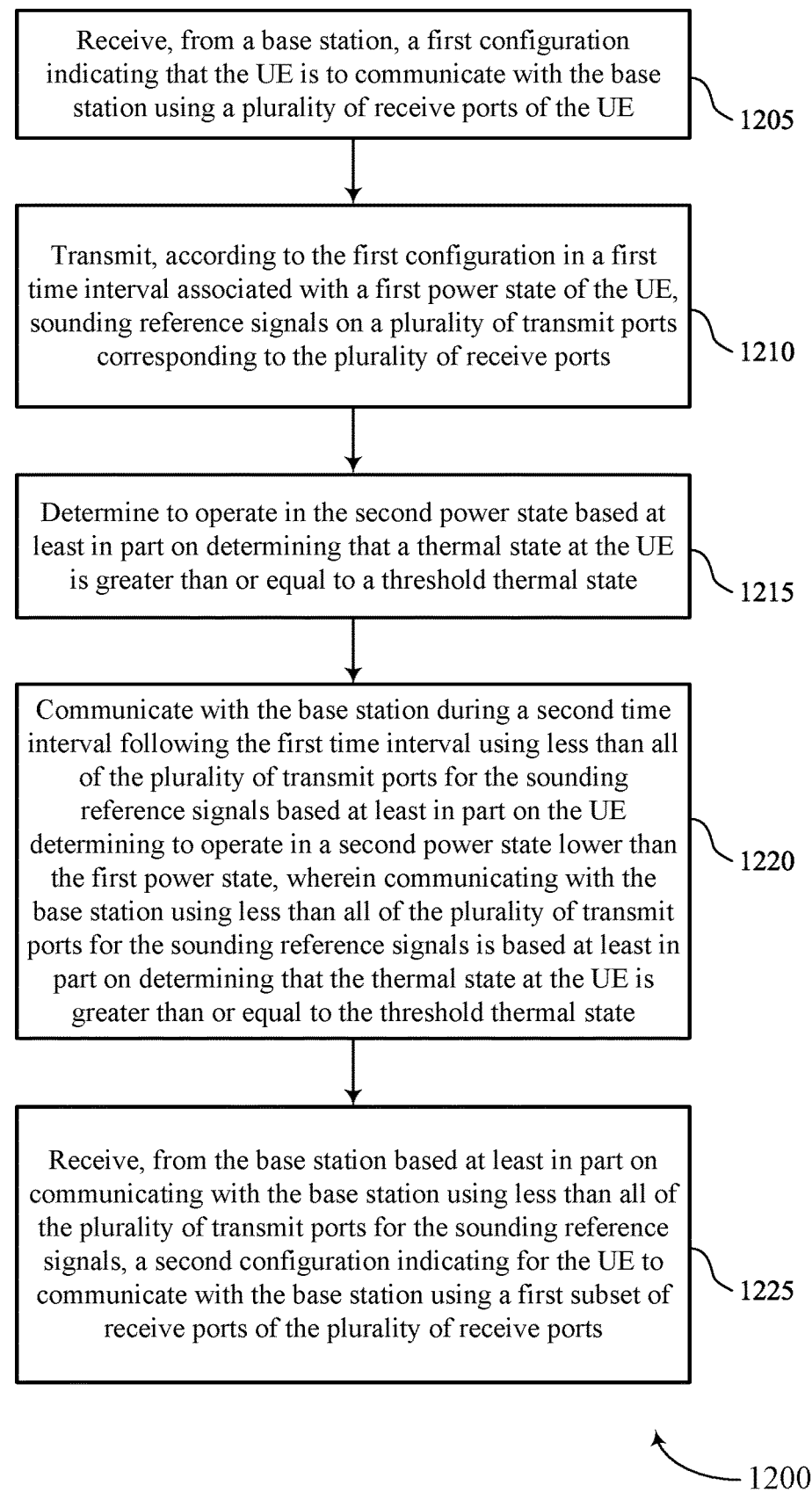

FIG. 12 shows a flowchart illustrating a method 1200 that supports techniques for thermal mitigation and power saving in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a first configuration indicating that the UE is to communicate with the base station using a set of multiple receive ports of the UE. The operations of 1205 may be performed in accordance with examples as disclosed herein. In some examples, aspects of the operations of 1205 may be performed by a configuration receiving manager 725 as described with reference to FIG. 7.

At 1210, the method may include transmitting, according to the first configuration in a first time interval associated with a first power state of the UE, SRSs on a set of multiple transmit ports corresponding to the set of multiple receive ports. The operations of 1210 may be performed in accordance with examples as disclosed herein. In some examples, aspects of the operations of 1210 may be performed by an SRS transmission manager 730 as described with reference to FIG. 7.

At 1215, the method may include determining to operate in the second power state based on determining that a thermal state at the UE is greater than or equal to a threshold thermal state. The operations of 1215 may be performed in accordance with examples as disclosed herein. In some examples, aspects of the operations of 1215 may be performed by a power state manager 740 as described with reference to FIG. 7.

At 1220, the method may include communicating with the base station during a second time interval following the first time interval using less than all of the set of multiple transmit ports for the SRSs based on the UE determining to operate in a second power state lower than the first power state, where communicating with the base station using less than all of the set of multiple transmit ports for the SRSs is based on determining that the thermal state at the UE is greater than or equal to the threshold thermal state. The operations of 1220 may be performed in accordance with examples as disclosed herein. In some examples, aspects of the operations of 1220 may be performed by a base station communicating manager 735 as described with reference to FIG. 7.

At 1225, the method may include receiving, from the base station based on communicating with the base station using less than all of the set of multiple transmit ports for the SRSs, a second configuration indicating for the UE to communicate with the base station using a first subset of receive ports of the set of multiple receive ports. The operations of 1225 may be performed in accordance with examples as disclosed herein. In some examples, aspects of the operations of 1225 may be performed by a configuration receiving manager 725 as described with reference to FIG. 7.

Figure 13:
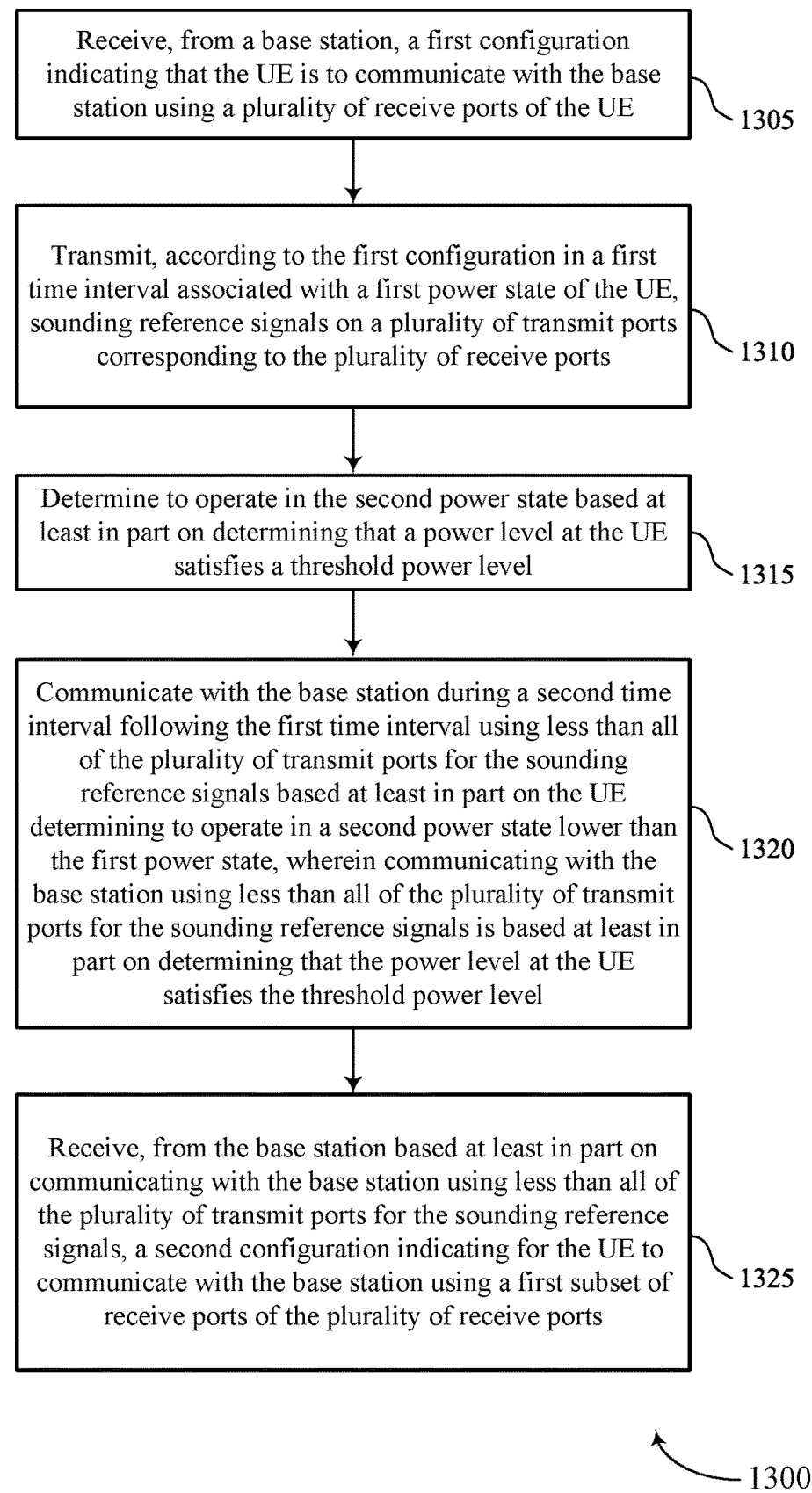

FIG. 13 shows a flowchart illustrating a method 1300 that supports techniques for thermal mitigation and power saving in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first configuration indicating that the UE is to communicate with the base station using a set of multiple receive ports of the UE. The operations of 1305 may be performed in accordance with examples as disclosed herein. In some examples, aspects of the operations of 1305 may be performed by a configuration receiving manager 725 as described with reference to FIG. 7.

At 1310, the method may include transmitting, according to the first configuration in a first time interval associated with a first power state of the UE, SRSs on a set of multiple transmit ports corresponding to the set of multiple receive ports. The operations of 1310 may be performed in accordance with examples as disclosed herein. In some examples, aspects of the operations of 1310 may be performed by an SRS transmission manager 730 as described with reference to FIG. 7.

At 1315, the method may include determining to operate in the second power state based on determining that a power level at the UE satisfies a threshold power level. The operations of 1315 may be performed in accordance with examples as disclosed herein. In some examples, aspects of the operations of 1315 may be performed by a power state manager 740 as described with reference to FIG. 7.

At 1320, the method may include communicating with the base station during a second time interval following the first time interval using less than all of the set of multiple transmit ports for the SRSs based on the UE determining to operate in a second power state lower than the first power state, where communicating with the base station using less than all of the set of multiple transmit ports for the SRSs is based on determining that the power level at the UE satisfies the threshold power level. The operations of 1320 may be performed in accordance with examples as disclosed herein. In some examples, aspects of the operations of 1320 may be performed by a base station communicating manager 735 as described with reference to FIG. 7.

At 1325, the method may include receiving, from the base station based on communicating with the base station using less than all of the set of multiple transmit ports for the SRSs, a second configuration indicating for the UE to communicate with the base station using a first subset of receive ports of the set of multiple receive ports. The operations of 1325 may be performed in accordance with examples as disclosed herein. In some examples, aspects of the operations of 1325 may be performed by a configuration receiving manager 725 as described with reference to FIG. 7.

The following provides an overview of aspects of the present disclosure:

Aspect 1: A method for wireless communication at a UE, comprising: receiving, from a base station, a first configuration indicating that the UE is to communicate with the base station using a plurality of receive ports of the UE; transmitting, according to the first configuration in a first time interval associated with a first power state of the UE, SRSs on a plurality of transmit ports corresponding to the plurality of receive ports; communicating with the base station during a second time interval following the first time interval using less than all of the plurality of transmit ports for the SRSs based at least in part on the UE determining to operate in a second power state lower than the first power state; and receiving, from the base station based at least in part on communicating with the base station using less than all of the plurality of transmit ports for the SRSs, a second configuration indicating for the UE to communicate with the base station using a first subset of receive ports of the plurality of receive ports.

Aspect 2: The method of aspect 1, wherein communicating with the base station using less than all of the plurality of transmit ports for the SRSs comprises: refraining from transmitting SRSs on all transmit ports of the plurality of transmit ports, wherein receiving the second configuration is based at least in part on the UE refraining from transmitting SRSs on all of the transmit ports.

Aspect 3: The method of any of aspects 1 through 2, wherein communicating with the base station using less than all of the plurality of transmit ports for the SRSs comprises: transmitting, during the second time interval, SRSs on a subset of transmit ports of the plurality of transmit ports, wherein receiving the second configuration is based at least in part on transmitting the SRSs on the subset of transmit ports.

Aspect 4: The method of aspect 3, further comprising: determining one or more parameters associated with the plurality of receive ports; and selecting the subset of transmit ports of the plurality of transmit ports corresponding to a subset of receive ports of the plurality of receive ports based at least in part on the one or more parameters, wherein transmitting the SRSs on the subset of transmit ports is based at least in part on the selecting.

Aspect 5: The method of aspect 4, wherein the one or more parameters associated with the plurality of receive ports comprise a RSSI metric, a RSRP metric, a RSRQ metric, a SNR, a SINR, or any combination thereof.

Aspect 6: The method of any of aspects 3 through 5, wherein the plurality of transmit ports comprises four transmit ports, and the subset of transmit ports comprises one or two transmit ports.

Aspect 7: The method of any of aspects 1 through 6, further comprising: determining to operate in the second power state based at least in part on determining that a thermal state at the UE is greater than or equal to a threshold thermal state, wherein communicating with the base station using less than all of the plurality of transmit ports for the SRSs is based at least in part on determining that the thermal state at the UE is greater than or equal to the threshold thermal state.

Aspect 8: The method of aspect 7, wherein the thermal state comprises a skin temperate of the UE, a junction temperature of the UE, or both.

Aspect 9: The method of any of aspects 1 through 8, further comprising: determining to operate in the second power state based at least in part on determining that a power level at the UE satisfies a threshold power level, wherein communicating with the base station using less than all of the plurality of transmit ports for the SRSs is based at least in part on determining that the power level at the UE satisfies the threshold power level.

Aspect 10: The method of aspect 9, wherein the power level satisfies the threshold power level when the power level is less than or equal to the threshold power level.

Aspect 11: The method of any of aspects 9 through 10, wherein the power level comprises a battery level of the UE.

Aspect 12: The method of any of aspects 1 through 11, further comprising: transmitting, to the base station, a channel state feedback report based at least in part on the UE determining to operate in the second power state, wherein receiving the second configuration is based at least in part on transmitting the channel state feedback report and communicating with the base station using less than all of the plurality of transmit ports for the SRSs.

Aspect 13: The method of aspect 12, further comprising: determining a rank associated with communications with the base station using one or more receive ports of the plurality of receive ports; selectively adjusting the determined rank to generate an adjusted rank less than the determined rank based at least in part on the UE determining to operate in the second power state, wherein the channel state feedback report comprises an indication of the adjusted rank.

Aspect 14: The method of any of aspects 12 through 13, further comprising: determining a CQI associated with communications with the base station using one or more receive ports of the plurality of receive ports; selectively adjusting the determined CQI to generate an adjusted CQI less than the determined CQI based at least in part on the UE determining to operate in the second power state, wherein the channel state feedback report comprises an indication of the adjusted CQI.

Aspect 15: The method of any of aspects 1 through 14, further comprising: transmitting, to the base station, a capability report comprising an indication of one or more transmission-reception modes supported by the UE, wherein receiving the first configuration is based at least in part on transmitting the capability report.

Aspect 16: The method of aspect 15, wherein the one or more transmission-reception modes comprise a transmission-reception mode indicating one transmission port and four reception ports for the UE, a transmission-reception mode indicating two transmission ports and four reception ports for the UE, or both.

Aspect 17: The method of any of aspects 1 through 16, further comprising: selectively adjusting one or more parameters associated with a second subset of receive ports of the plurality of receive ports based at least in part on receiving the second configuration.

Aspect 18: The method of aspect 17, wherein the one or more parameters are associated with a LNA for the second subset of receive ports, a phase shifter for the second subset of receive ports, or both.

Aspect 19: An apparatus for wireless communication at a UE, comprising a processor; memory coupled with the processor; and instructions stored in the memory and executable by the processor to cause the apparatus to perform a method of any of aspects 1 through 18.

Aspect 20: An apparatus for wireless communication at a UE, comprising at least one means for performing a method of any of aspects 1 through 18.

Aspect 21: A non-transitory computer-readable medium storing code for wireless communication at a UE, the code comprising instructions executable by a processor to perform a method of any of aspects 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a first configuration indicating that the UE is to communicate with the base station using a plurality of receive ports of the UE;
   transmitting, according to the first configuration in a first time interval associated with a first power state of the UE, sounding reference signals on a plurality of transmit ports corresponding to the plurality of receive ports;
   communicating with the base station during a second time interval following the first time interval using less than all of the plurality of transmit ports for the sounding reference signals based at least in part on the UE determining to operate in a second power state lower than the first power state; and
   receiving, from the base station based at least in part on communicating with the base station using less than all of the plurality of transmit ports for the sounding reference signals, a second configuration indicating for the UE to communicate with the base station using a first subset of receive ports of the plurality of receive ports.

2. The method of claim 1, wherein communicating with the base station using less than all of the plurality of transmit ports for the sounding reference signals comprises:
   refraining from transmitting sounding reference signals on all transmit ports of the plurality of transmit ports, wherein receiving the second configuration is based at least in part on the UE refraining from transmitting sounding reference signals on all of the transmit ports.

3. The method of claim 1, wherein communicating with the base station using less than all of the plurality of transmit ports for the sounding reference signals comprises:
   transmitting, during the second time interval, sounding reference signals on a subset of transmit ports of the plurality of transmit ports, wherein receiving the second configuration is based at least in part on transmitting the sounding reference signals on the subset of transmit ports.

4. The method of claim 3, further comprising:
   determining one or more parameters associated with the plurality of receive ports; and selecting the subset of transmit ports of the plurality of transmit ports corresponding to a subset of receive ports of the plurality of receive ports based at least in part on the one or more parameters, wherein transmitting the sounding reference signals on the subset of transmit ports is based at least in part on the selecting.

5. The method of claim 4, wherein the one or more parameters associated with the plurality of receive ports comprise a received signal strength indicator metric, a reference signal received power metric, a reference signal received quality metric, a signal-to-noise ratio, a signal-to-interference plus noise ratio, or any combination thereof.

6. The method of claim 3, wherein the plurality of transmit ports comprises four transmit ports, and wherein the subset of transmit ports comprises one or two transmit ports.

7. The method of claim 1, further comprising:
determining to operate in the second power state based at least in part on determining that a thermal state at the UE is greater than or equal to a threshold thermal state, wherein communicating with the base station using less than all of the plurality of transmit ports for the sounding reference signals is based at least in part on determining that the thermal state at the UE is greater than or equal to the threshold thermal state.

8. The method of claim 7, wherein the thermal state comprises a skin temperate of the UE, a junction temperature of the UE, or both.

9. The method of claim 1, further comprising:
determining to operate in the second power state based at least in part on determining that a power level at the UE satisfies a threshold power level, wherein communicating with the base station using less than all of the plurality of transmit ports for the sounding reference signals is based at least in part on determining that the power level at the UE satisfies the threshold power level.

10. The method of claim 9, wherein the power level satisfies the threshold power level when the power level is less than or equal to the threshold power level.

11. The method of claim 9, wherein the power level comprises a battery level of the UE.

12. The method of claim 1, further comprising:
transmitting, to the base station, a channel state feedback report based at least in part on the UE determining to operate in the second power state, wherein receiving the second configuration is based at least in part on transmitting the channel state feedback report and communicating with the base station using less than all of the plurality of transmit ports for the sounding reference signals.

13. The method of claim 12, further comprising:
determining a rank associated with communications with the base station using one or more receive ports of the plurality of receive ports;
selectively adjusting the determined rank to generate an adjusted rank less than the determined rank based at least in part on the UE determining to operate in the second power state, wherein the channel state feedback report comprises an indication of the adjusted rank.

14. The method of claim 12, further comprising:
determining a channel quality indicator associated with communications with the base station using one or more receive ports of the plurality of receive ports;
selectively adjusting the determined channel quality indicator to generate an adjusted channel quality indicator less than the determined channel quality indicator based at least in part on the UE determining to operate in the second power state, wherein the channel state feedback report comprises an indication of the adjusted channel quality indicator.

15. The method of claim 1, further comprising:
transmitting, to the base station, a capability report comprising an indication of one or more transmission-reception modes supported by the UE, wherein receiving the first configuration is based at least in part on transmitting the capability report.

16. The method of claim 15, wherein the one or more transmission-reception modes comprise a transmission-reception mode indicating one transmission port and four reception ports for the UE, a transmission-reception mode indicating two transmission ports and four reception ports for the UE, or both.

17. The method of claim 1, further comprising:
selectively adjusting one or more parameters associated with a second subset of receive ports of the plurality of receive ports based at least in part on receiving the second configuration.

18. The method of claim 17, wherein the one or more parameters are associated with a low-noise amplifier for the second subset of receive ports, a phase shifter for the second subset of receive ports, or both.

19. An apparatus for wireless communication at a user equipment (UE), comprising:
a processor;
memory coupled with the processor; and
instructions stored in the memory and executable by the processor to cause the apparatus to:
receive, from a base station, a first configuration indicating that the UE is to communicate with the base station using a plurality of receive ports of the UE;
transmit, according to the first configuration in a first time interval associated with a first power state of the UE, sounding reference signals on a plurality of transmit ports corresponding to the plurality of receive ports;
communicate with the base station during a second time interval following the first time interval using less than all of the plurality of transmit ports for the sounding reference signals based at least in part on the UE determining to operate in a second power state lower than the first power state; and
receive, from the base station based at least in part on communicating with the base station using less than all of the plurality of transmit ports for the sounding reference signals, a second configuration indicating for the UE to communicate with the base station using a first subset of receive ports of the plurality of receive ports.

20. The apparatus of claim 19, wherein the instructions to communicate with the base station using less than all of the plurality of transmit ports for the sounding reference signals are executable by the processor to cause the apparatus to:
refrain from transmitting sounding reference signals on all transmit ports of the plurality of transmit ports, wherein receiving the second configuration is based at least in part on the UE refraining from transmitting sounding reference signals on all of the transmit ports.

21. The apparatus of claim 19, wherein the instructions to communicate with the base station using less than all of the plurality of transmit ports for the sounding reference signals are executable by the processor to cause the apparatus to:
transmit, during the second time interval, sounding reference signals on a subset of transmit ports of the plurality of transmit ports, wherein receiving the second configuration is based at least in part on transmitting the sounding reference signals on the subset of transmit ports.

22. The apparatus of claim 21, wherein the instructions are further executable by the processor to cause the apparatus to:
determine one or more parameters associated with the plurality of receive ports; and
select the subset of transmit ports of the plurality of transmit ports corresponding to a subset of receive ports of the plurality of receive ports based at least in part on the one or more parameters, wherein transmitting the sounding reference signals on the subset of transmit ports is based at least in part on the selecting.

23. The apparatus of claim 22, wherein the one or more parameters associated with the plurality of receive ports comprise a received signal strength indicator metric, a reference signal received power metric, a reference signal received quality metric, a signal-to-noise ratio, a signal-to-interference plus noise ratio, or any combination thereof.

24. The apparatus of claim 21, wherein the plurality of transmit ports comprises four transmit ports, and wherein the subset of transmit ports comprises one or two transmit ports.

25. The apparatus of claim 19, wherein the instructions are further executable by the processor to cause the apparatus to:
determine to operate in the second power state based at least in part on determining that a thermal state at the UE is greater than or equal to a threshold thermal state, wherein communicating with the base station using less than all of the plurality of transmit ports for the sounding reference signals is based at least in part on determining that the thermal state at the UE is greater than or equal to the threshold thermal state.

26. The apparatus of claim 19, wherein the instructions are further executable by the processor to cause the apparatus to:
determine to operate in the second power state based at least in part on determining that a power level at the UE satisfies a threshold power level, wherein communicating with the base station using less than all of the plurality of transmit ports for the sounding reference signals is based at least in part on determining that the power level at the UE satisfies the threshold power level.

27. The apparatus of claim 19, wherein the instructions are further executable by the processor to cause the apparatus to:
transmit, to the base station, a channel state feedback report based at least in part on the UE determining to operate in the second power state, wherein receiving the second configuration is based at least in part on transmitting the channel state feedback report and communicating with the base station using less than all of the plurality of transmit ports for the sounding reference signals.

28. The apparatus of claim 19, wherein the instructions are further executable by the processor to cause the apparatus to:
transmit, to the base station, a capability report comprising an indication of one or more transmission-reception modes supported by the UE, wherein receiving the first configuration is based at least in part on transmitting the capability report.

29. An apparatus for wireless communication at a user equipment (UE), comprising:
means for receiving, from a base station, a first configuration indicating that the UE is to communicate with the base station using a plurality of receive ports of the UE;
means for transmitting, according to the first configuration in a first time interval associated with a first power state of the UE, sounding reference signals on a plurality of transmit ports corresponding to the plurality of receive ports;
means for communicating with the base station during a second time interval following the first time interval using less than all of the plurality of transmit ports for the sounding reference signals based at least in part on the UE determining to operate in a second power state lower than the first power state; and
means for receiving, from the base station based at least in part on communicating with the base station using less than all of the plurality of transmit ports for the sounding reference signals, a second configuration indicating for the UE to communicate with the base station using a first subset of receive ports of the plurality of receive ports.

30. A non-transitory computer-readable medium storing code for wireless communication at a user equipment (UE), the code comprising instructions executable by a processor to:
receive, from a base station, a first configuration indicating that the UE is to communicate with the base station using a plurality of receive ports of the UE;
transmit, according to the first configuration in a first time interval associated with a first power state of the UE, sounding reference signals on a plurality of transmit ports corresponding to the plurality of receive ports;
communicate with the base station during a second time interval following the first time interval using less than all of the plurality of transmit ports for the sounding reference signals based at least in part on the UE determining to operate in a second power state lower than the first power state; and
receive, from the base station based at least in part on communicating with the base station using less than all of the plurality of transmit ports for the sounding reference signals, a second configuration indicating for the UE to communicate with the base station using a first subset of receive ports of the plurality of receive ports.

* * * * *